United States Patent
Takashige et al.

(10) Patent No.: US 7,649,851 B2
(45) Date of Patent: Jan. 19, 2010

(54) VIRTUAL NETWORK MANAGEMENT METHOD, VIRTUAL NETWORK MANAGEMENT PROGRAM, VIRTUAL NETWORK MANAGEMENT SYSTEM, AND VIRTUAL NETWORK MEANS

(75) Inventors: Souichi Takashige, Yokohama (JP); Takeshi Ishizaki, Yokohama (JP); Shigeru Miyake, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 607 days.

(21) Appl. No.: 11/402,055

(22) Filed: Apr. 12, 2006

(65) Prior Publication Data

US 2007/0110077 A1 May 17, 2007

(30) Foreign Application Priority Data

Nov. 11, 2005 (JP) .............................. 2005-328141

(51) Int. Cl.
*H04L 12/28* (2006.01)
(52) U.S. Cl. ...................... 370/254; 370/389; 370/401; 709/226
(58) Field of Classification Search ....................... None
See application file for complete search history.

(56) References Cited

U.S. PATENT DOCUMENTS

| | | | | |
|---|---|---|---|---|
| 5,721,825 A | * | 2/1998 | Lawson et al. | 709/203 |
| 6,971,044 B2 | * | 11/2005 | Geng et al. | 714/11 |
| 7,080,378 B1 | * | 7/2006 | Noland et al. | 718/104 |
| 7,130,900 B2 | * | 10/2006 | Shiga et al. | 709/223 |
| 2003/0069972 A1 | | 4/2003 | Yoshimura et al. | |
| 2007/0250608 A1 | * | 10/2007 | Watt | 709/222 |

FOREIGN PATENT DOCUMENTS

JP        2003-124976        4/2003

* cited by examiner

*Primary Examiner*—Hong Cho
*Assistant Examiner*—Robert C Scheibel
(74) *Attorney, Agent, or Firm*—McDermott Will & Emery LLP

(57) ABSTRACT

The invention relates to a network management method wherein: a service management equipment holds the mapping of services and virtual networks as management information; a managed server sends an advice to a VLAN management equipment when its status changes; and the VLAN management equipment receives the advice and refers to the information contained in the advice to thereby identify the managed server and the connection port of a network switch, and configures a virtual network belonging to the identified port of the network switch. The method alleviates the task of reconfiguration associated with the adding or deleting of servers.

7 Claims, 20 Drawing Sheets

FIG.3

FDB table

| MAC address | Managed server side port number |
|---|---|
| 00:00:00:00:00:00 | 0/0 |
| 00:00:00:00:00:01 | 0/1 |
| ⋮ | ⋮ |
|  |  |

FIG.4

VLAN ID-to-delete queue table

| VLAN-ID | VLAN ID-to-delete queue |
|---------|-------------------------|
| VLAN-10 | ●● ⋯ ●  ← VLAN-ID |
| VLAN-20 | ●● ⋯ ● |
| ⋮ | ⋮ |
|  | ●● ⋯ ● |

Monitored port list

| Network switch ID | Port number |
|---|---|
| SW1 | 0/0-0/7 |
| SW2 | 0/0-0/16 |
| ⋮ | ⋮ |
|  |  |

Service-VLAN mapping table

| Service name | VLAN-ID |
|---|---|
| Web service | VLAN10 |
| Inventory management service | VLAN20 |
| Order management service | VLAN30 |
| ⋮ | ⋮ |

FIG.19

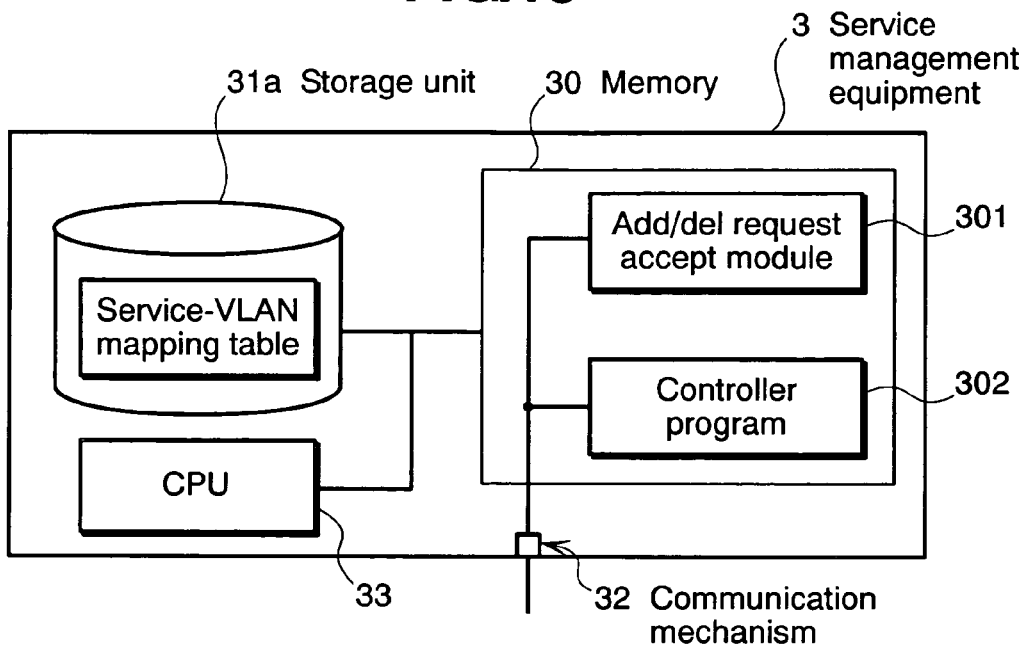

FIG.20

Service-VLAN mapping table

| Service name | VLAN-ID | Conditions list |
|---|---|---|
| Web service | VLAN10 | Conditions list 1 |
| Web service | VLAN20 | Conditions list 2 |
| Inventory management service | VLAN30 | Conditions list 3 |
| Order management service | VLAN40 | Conditions list 4 |
| Order management service | VLAN50 | Conditions list 5 |
| Order management service | VLAN60 | Conditions list 6 |

Conditions list

| ID to be judged | Number to be judged |
|---|---|
| Network switch ID | SW-1 |
| NIC-ID | NIC-1 |

⋮          ⋮

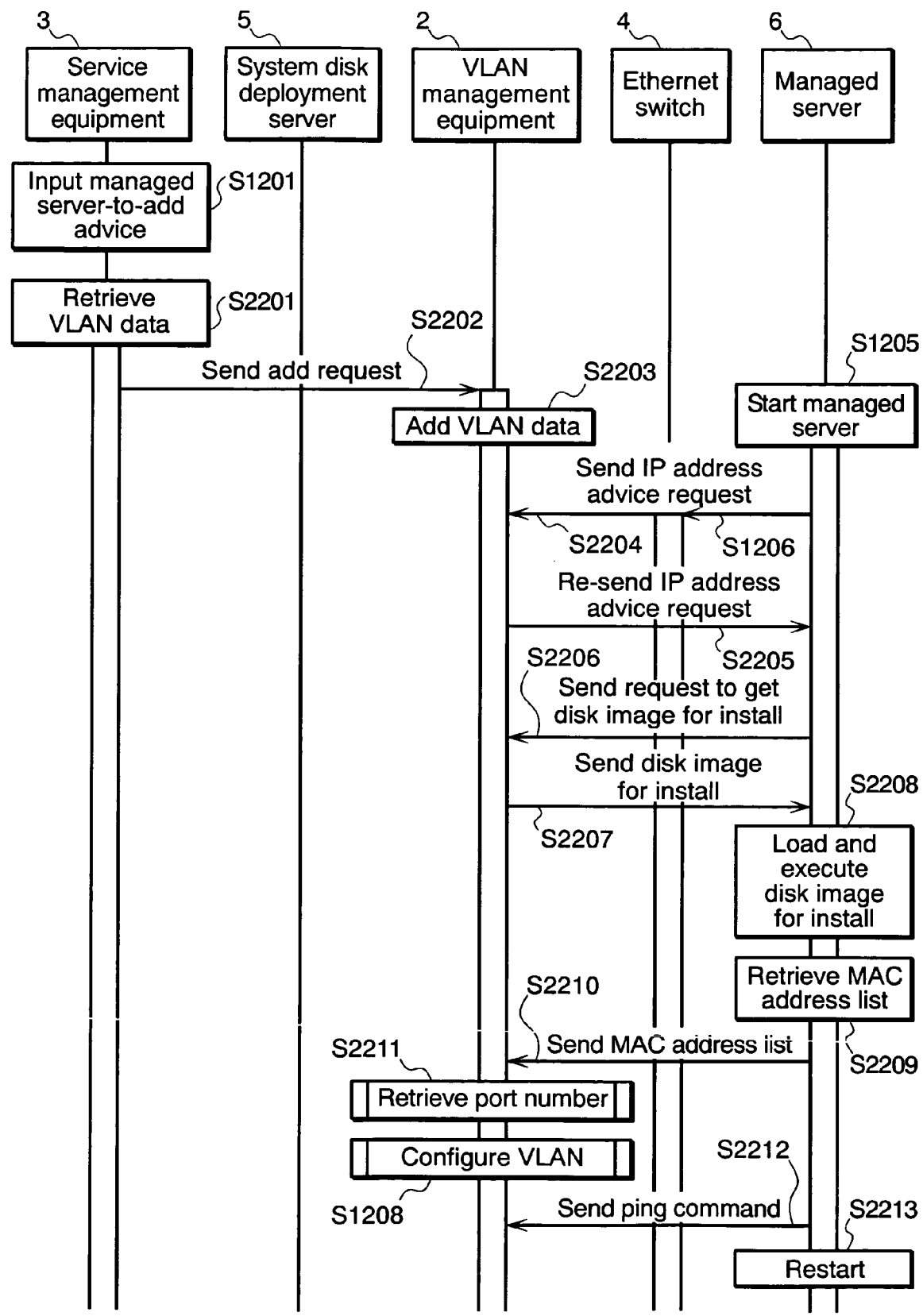

FIG.23

MAC address list

| NIC-ID | MAC address |
|--------|-------------|
| NIC-1  | XX:XX:XX:XX:XX:XX |
| NIC-2  | YY:YY:YY:YY:YY:YY |

VIRTUAL NETWORK MANAGEMENT METHOD, VIRTUAL NETWORK MANAGEMENT PROGRAM, VIRTUAL NETWORK MANAGEMENT SYSTEM, AND VIRTUAL NETWORK MEANS

CLAIM OF PRIORITY

The present application claims priority from Japanese application P2005-328141 filed on Nov. 11, 2005, the content of which is hereby incorporated by reference in this application.

FIELD OF THE INVENTION

The present invention relates to a network management method wherein plural services are processed by computers grouped for each service, and particularly to a technology to automatically configure a computer added to or deleted from the network.

BACKGROUND OF THE INVENTION

In recent years, it has become important for data centers, information systems, and the like to improve the utilization of the servers by concentrating the processing of plural services on a space-saving system consisting of a small number of servers, and to thereby increase the degree of integration of servers.

When operating an abovementioned server system, it is common to configure virtual networks by which to prevent servers belonging to different services from directly communicating with each other, for security reasons. The virtual networks refer to networks that are separated so that only specific servers of plural servers connected to one network switch can communicate with each other. This makes it impossible for two servers belonging to different virtual networks to directly communicate with each other. Implementations of the virtual network include VLAN (Virtual Local Area Network: the virtual network described in claims)

To operate such virtual networks, it is necessary to configure which network individual servers within a system belong to, for the network switch that controls the flow of information in the network. Specifically, it is necessary to configure the ports on a network switch where the network switch and servers are connected. This made it necessary to reconfigure the virtual networks each time a server is added to the system, a server is replaced for repair, a server used for a service A is to be used for another service B, or the like.

Also, whenever adding, replacing, or changing the use of a server, its initialization is required to operate its service. Generally, the initialization involves installing an operating system (OS) and software and the subsequent setup.

Thus, when a server is added, replaced, or use of a server is changed within a virtual network, it was necessary to reconfigure both the network and the hard disk drive in order to use the server for a specific service.

Technologies are disclosed that enables previously registering the configuration for each port of a network switch and the configuration for a storage device, and performing network switch configuration and storage device configuration in a lump when a change, such as a change in the service of a server, is made (refer to, for example, Patent Document 1: Japanese Patent Laid-open No. 2003-124976 and U.S. Pat. No. US2003069972A1).

However, in prior arts, it is necessary to previously define the virtual network configuration for a network switch or the configuration for a storage device. This makes it necessary to manage the correspondence between servers and ports, that is, which server in the system is connected to which port. For a system containing a large number network switches and servers, such as a system of a data center, the cost of managing these devices was a substantial burden.

Furthermore, if the server configuration is changed frequently due to failure or something like that, or if a gradual increase of servers is assumed in the operation of the system, it is necessary to change the configuration manually each time a change is made, necessitating the cost of change and increasing a risk of operation error.

In addition, migrating the configuration of a specific system to another hardware configuration requires information that depends on individual equipment, making it difficult to reuse the information on the original equipment.

SUMMARY OF THE INVENTION

In view of the above problems, an object of the present invention is to alleviate the task of reconfiguration associated with the adding or deleting of a server.

An aspect of the present invention is directed to a virtual network management method for a virtual network management system that configures different virtual networks for different services, includes at least one network switch; at least on managed server that manages services, ; a service management means for managing the services to be processed by the managed server; and a virtual network management means for controlling the connections by the network switch, wherein: the service management means holds the mapping between the service and the virtual network as management information; the managed server, when its status changes, transmits an advice including own information to the virtual network management means; the virtual network management means receives the advice and identifies the connection port for the managed server and the network switch by referring to the information contained in the received advice, and then configures the virtual network corresponding to the service for the identified connection port.

According to the aspect of the present invention, it is possible to alleviate the task of reconfiguration associated with addition or deletion of servers.

BRIEF DESCRIPTION OF THE DRAWINGS

Embodiments of the present invention will be described in detail based on the following figures, wherein:

FIG. 3 is a diagram showing a format of an FDB (Forwarding Data Base) table of the first embodiment;

FIG. 4 is a diagram showing a format of a queue table for VLAN IDs to be deleted, according to the first embodiment;

FIG. 19 is a diagram showing a configuration of a service management equipment of the second embodiment;

FIG. 20 is a diagram showing a configuration of a service-VLAN mapping table of the second embodiment;

FIG. 21 is a diagram showing a configuration of a condition list of the second embodiment;

FIG. 22 is a timing chart showing a process of adding a managed server to a VLAN management system of the second embodiment;

FIG. 23 is a diagram showing a format of a MAC address list of the second embodiment;

DESCRIPTION OF THE EMBODIMENTS

Embodiments of the present invention are described below with reference to the drawings.

First Embodiment

Figure 1:
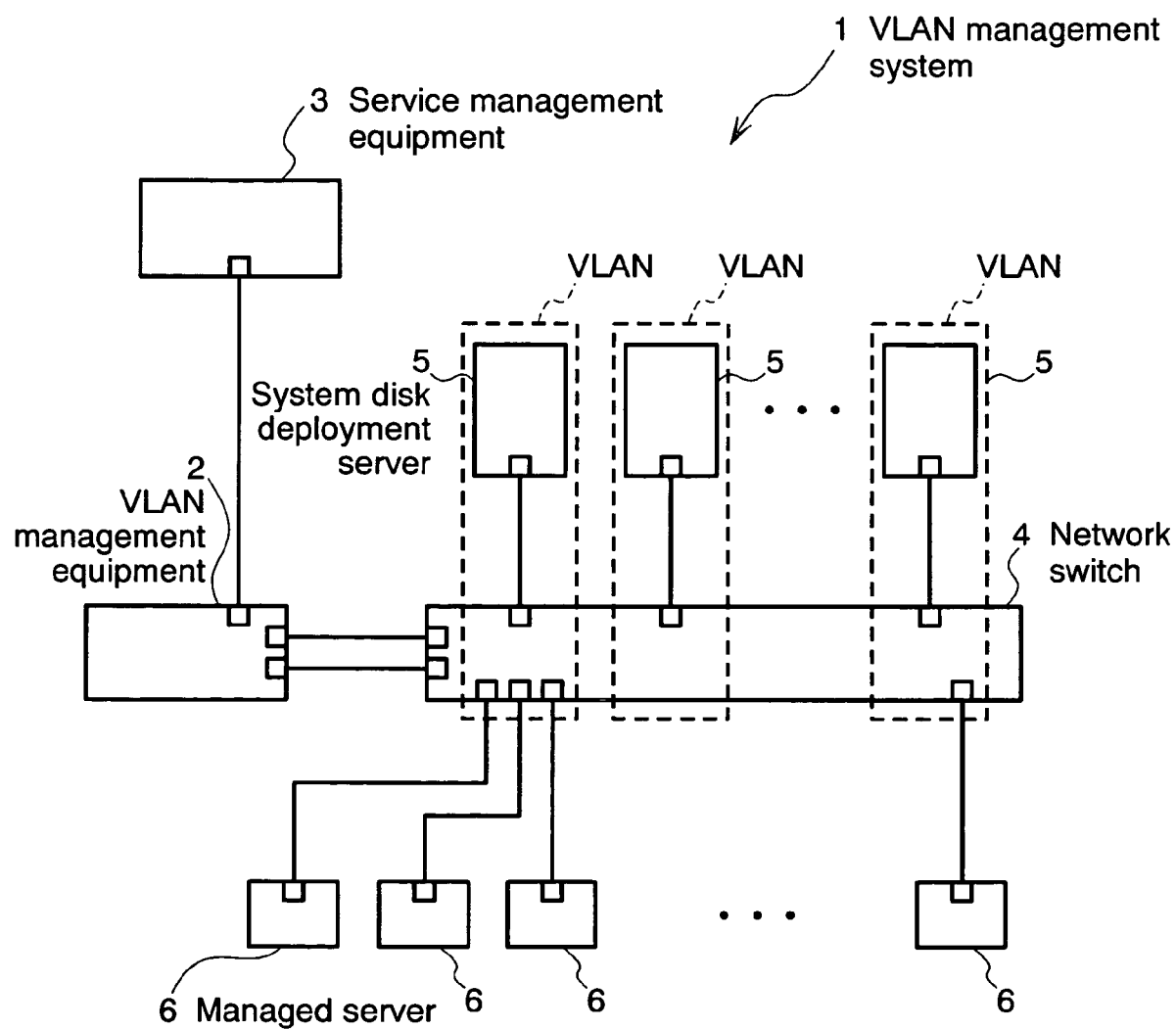
FIG. 1 is diagram showing a configuration of a VLAN management system of a first embodiment.

VLAN Management System Configuration:

FIG. 1 is a diagram showing a configuration of a VLAN management system of a first embodiment.

In this embodiment, A VLAN management system 1 (the virtual network management system described in claims) includes at least one network switch 4 (one in this embodiment), plural managed servers 6 connected to the network switch, a VLAN management equipment 2 (the virtual network management means in claims), and a service management equipment 3 (the service management means in claims).

Respective managed servers 6 are grouped according to different VLANs for different services, and a group of VLANs has at least one network switch 4 (one in this embodiment) and at least one system disk deployment server (the system disk deployment means in claims, more than one in this embodiment).

The VLAN management equipment 2 controls the connections by the network switch 4, and the service management equipment 3 manages the services to be processed by the managed server 6.

Figures 7, 8:
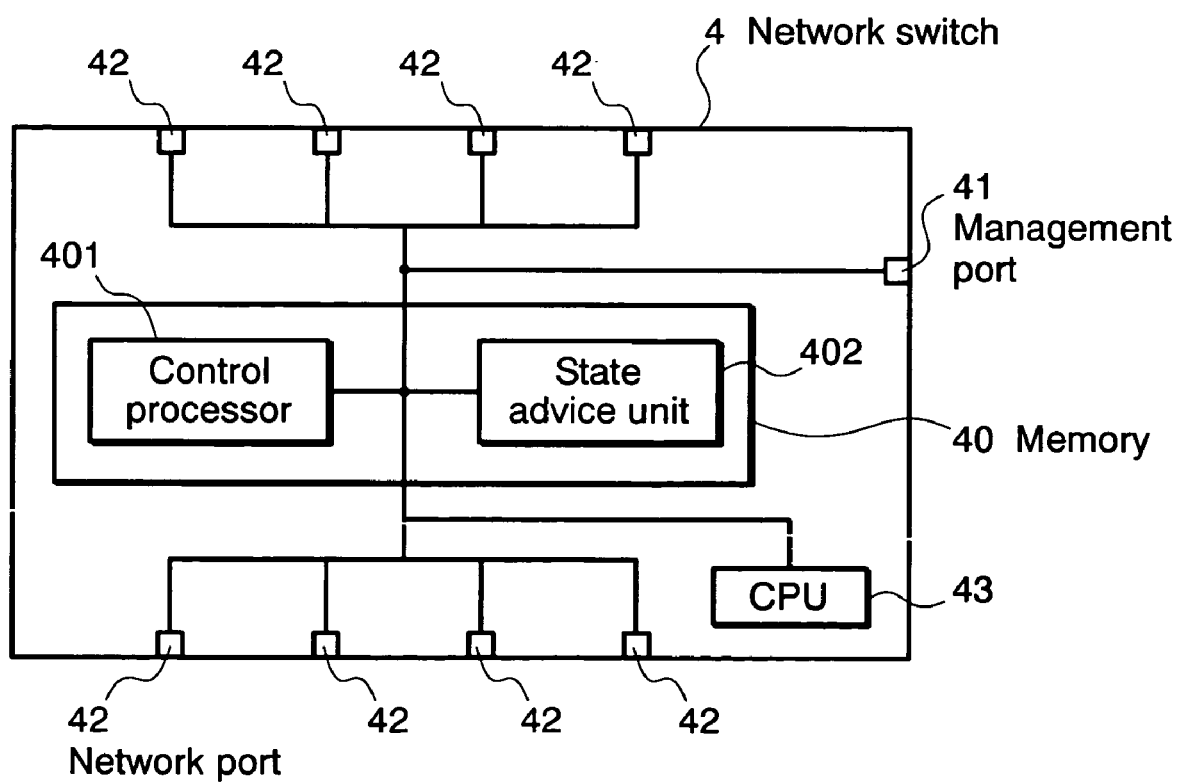
FIG. 7 is a diagram showing a format of a service-VLAN mapping table of the first embodiment.
FIG. 8 is a diagram showing a configuration of a network switch of the first embodiment.

The network switch 4 forms a VLAN by controlling respective ports provided thereon and grouping the ports. In this specification, the management port 41 and network port 42 shown in FIG. 8 are collectively referred to as ports.

The system disk deployment server 5 has functions such as deploying disk images for install that are to be installed in a new managed server 6, and the like.

The managed server 6 provides a functional service function (hereinafter referred to as a service) implemented in software. Examples of the service include a Web service and an inventory management service. One service is provided by one or more managed servers 6.

VLAN Management Equipment Configuration:

A configuration of the VLAN management system of the first embodiment is described below with reference to FIG. 2 as well as FIGS. 1 and 8.

Figure 2:
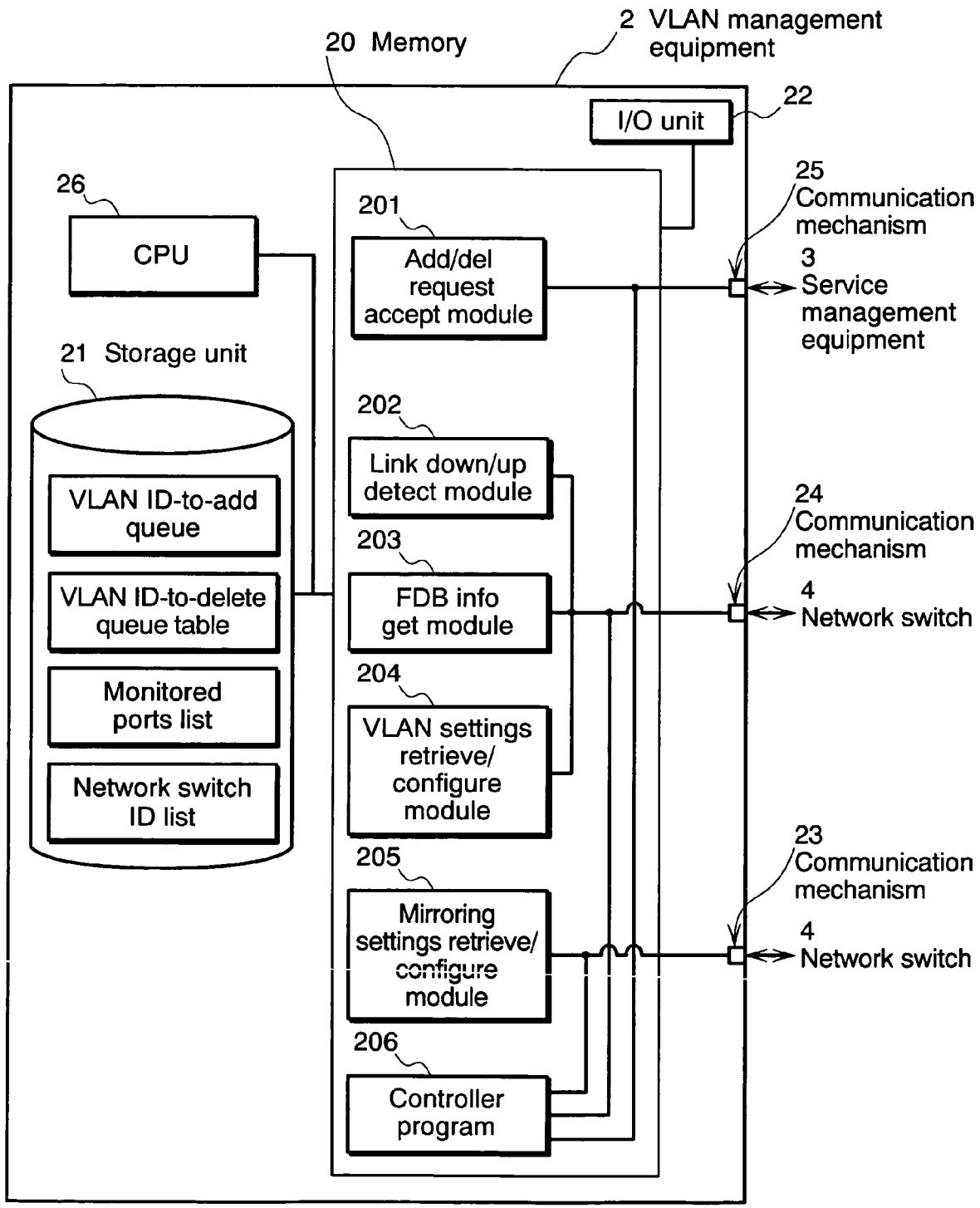
FIG. 2 is a diagram showing a configuration of a VLAN management equipment of the first embodiment.

FIG. 2 is a diagram showing a configuration of the VLAN management equipment of the first embodiment.

The VLAN management equipment 2 has a function of managing one or more network switches 4 used in the VLAN management system 1, and that the function is implemented, for example, by a CPU 26 and a program running on the CPU 26.

The VLAN management equipment 2 contains a memory 20, a storage unit 21 and the CPU 26, and further communication mechanisms 23 through 25 and an I/O unit 22 for input/output of the information.

When the VLAN management equipment is activated, an add/del request accept module 201, a link down/up detect module 202, an FDB (Forwarding Data Base) info retrieve module 203, a VLAN settings retrieve/configure module 204, a mirroring settings retrieve/configure module 205, and a controller program 206 that performs various processing are read out and is executed by the CPU 26.

The communication mechanisms 23 and 24 are connected to a management port 41 of the network switch 4 (refer to FIG. 8). The communication mechanism 25 is connected to the service management equipment 3. Here, the communication mechanism includes a port and an element to which the port is connected. For example, the communication mechanism 25 includes the port and the connection line to the service management equipment 3.

The add/del request accept module 201 processes add requests or delete requests from the service management equipment 3. The add requests and delete requests are received by the add/del accept module 201 via the communication mechanism 25. These requests contain a VLAN ID corresponding to a service to be added or deleted. The add/del request accept module 201 adds this VLAN ID to a VLAN ID-to-add queue or a VLAN ID-to-delete queue as data. Here, the VLAN ID is a number to uniquely identify the VLAN.

The link down/up detection module 202 receives a link down advice and the like that is sent from a status communication unit 402 of the network switch 4 (described later with reference to FIG. 8) via the communication mechanism 24. The link down advice is an advice to be sent by the network switch 4 when an event such as a stop of the managed server 6 occurs, and contains information on the port to which the stopped managed server is connected and the like. This function allows the VLAN management equipment 2 to detect the status such as a stop of the managed server 6 connected to the network, and the status of the port of a network switch to which the managed server 6 is connected when an event such as a server stop occurs.

The FDB retrieve module 203 can retrieve an FDB table indicating a port (managed server side port) through which a packet is input to the network switch 4, from the network switch 4. The FDB retrieve module 203 sends an FDB retrieve request to the control processor 401 of the network switch 4 (refer to FIG. 8), and the control processor 401 sends the FDB table to the FDB retrieve module 203.

Now, the FDB table is described below with reference to FIGS. 1 and 8.

FIG. 3 shows a format of the FDB table of the first embodiment.

The FDB table holds the MAC (Media Access Control) addresses of a network interface of the managed server 6 and the managed server side port numbers that are port numbers of the network port 42 (managed server side ports) of the network switch 4 connected to the managed server 4 having these MAC addresses, by making them to correspond to each other. Here, the port number is a number uniquely identified for each port.

The FDB table indicates that, when the destination address of a packet input to the network switch 4 from the system disk deployment server 5 or VLAN management equipment 2 is a MAC address held in the FDB table, this packet is sent to a managed server side port corresponding to that MAC address.

Referring again to FIG. 2, the VLAN info retrieve/configure module 204 has a function of retrieving VLAN information on each port of the network switch 4. The VLAN info retrieve/configure module 204 communicates with the control processor 401 of the network switch 4 via the communication mechanism 24, to obtain VLAN information. Here, the VLAN information is the information in which the VLAN ID for VLAN set in the network switch 4, described later with reference to FIG. 8, and the port number of the network port 42 (refer to FIG. 8) of the network switch 4 are made to correspond to each other. The format of a packet to send or receive follows the format provided by the network switch 4. The VLAN management equipment 2 is configured so as to obtain information, such as to which VLAN VLAN traffic data passing through each network port 42 of the network switch 4 is sent.

Moreover, the VLAN info retrieve/configure module 204 can update the VLAN configuration in the control processor 40 of the network switch 4, and configure which VLAN a packet passing through each port is to be sent to. This function allows VLAN configuration for each port of the network switch 4.

A mirroring info retrieve/configure module 205 can configure port mirroring (hereinafter referred to as mirroring) for any port of the network switch 4, by updating the control processor 401 of the network switch 4. When mirroring has been configured, the network switch 4 forwards traffic data that has passed one or more specific network ports 42 to a mirrored port as well as to a port to be forwarded. In this embodiment, the management port 41 to which the VLAN management equipment 2 is connected is configured as a mirrored port of the network switch 4. By this configuration, data input from a source port of the network switch 4 is forwarded to the management port 41, mirrored port, as well as to a destination port, and is sent to the VLAN management equipment 2 via the management port 41.

In addition, the mirroring info retrieve/configure module 205 can retrieve the traffic data received by a port of the network switch 4. That is, the traffic data input to a port of the network switch 4 is mirrored and thereby forwarded to a port of the communication mechanism 23 via the management port 41 of the network switch 4. This function allows the VLAN management equipment to obtain the data received by a port of the network switch 4 by means of the mirroring info retrieve/configure module 205.

A storage unit 21 stores a VLAN ID-to-add queue, a VLAN ID-to-delete queue table, a monitored port list, and a network switch ID list.

The VLAN ID-to-add queue is a queue that indicates which VLAN the managed server 6 is actually added to, when adding the managed server 6 to the VLAN management system 1. When the service management equipment 3 issues an add request to add the managed server 6 to a VLAN, the VLAN ID contained in the request is stocked in the VLAN ID-to-add queue. When actually adding the managed server 6 to the VLAN, the VLAN management equipment 2 refers to the VLAN ID stocked in the VLAN ID queue to add the managed server 6 to the VLAN, and then deletes the VLAN ID of the VLAN to which the managed server 6 is added, from the VLAN ID queue.

Now, an exemplary format of the VLAN ID-to-delete queue of the first embodiment is described below with reference to FIGS. 1 and 4.

FIG. 4 shows a format of the VLAN ID-to-delete queue of the first embodiment.

The VLAN-to-delete queue table is a list containing sets of VLAN ID to specify which VLAN and VLAN ID-delete queue that manages VLAN delete requests specified by VLAN IDs.

The VLAN ID queues stored in the entry for each VLAN ID are all the same VLAN ID queues.

The VLAN ID-to-delete queue is a queue that stores the data of a delete request to delete the stopped managed server 6 from the VLAN. The data to be stored is specifically a VLAN ID. When a request to delete the managed server 6 from a VLAN is issued, the VLAN ID is stocked in the queue corresponding to that VLAN. After that, when the managed server 6 belonging to VLAN specified by the delete request stops, that is, when the managed server 6 is deleted from the VLAN, the VLAN management equipment 2 deletes one of the VLAN IDs belonging to that VLAN from the VLAN ID-to-delete queue. In other words, presence of data in the VLAN ID-to-delete queue indicates that a request to delete the managed server 6 from a VLAN was previously issued. Conversely, absence of data in the queue indicates that a request to delete the managed server 6 from a VLAN was not issued. This means that if there is no VLAN ID in the corresponding queue, there is no managed server 6 to be deleted from the VLAN.

Referring again to FIG. 2, the monitored port list is a list of port numbers to which the managed server 6 is allowed to connect. In this embodiment, a list of ports of each network switch 4 to which the managed server 6 can be connected is registered in advance with the managed port list by the user via the I/O unit 22. With this list, however, it is not required to manage which port in the monitored port list each managed server 6 is connected to. Also, the managed servers 6 are not necessarily connected to the ports registered with the monitored port list, and no managed server may not be connected.

The network switch ID list holds a list of network switch IDs that individually identify the network switches 4 managed by the VLAN management equipment 2. The network switch ID will be described later in detail.

Now, an exemplary format of the monitored port of the first embodiment is described below with reference to FIGS. 1 and 5.

Figures 5, 6:
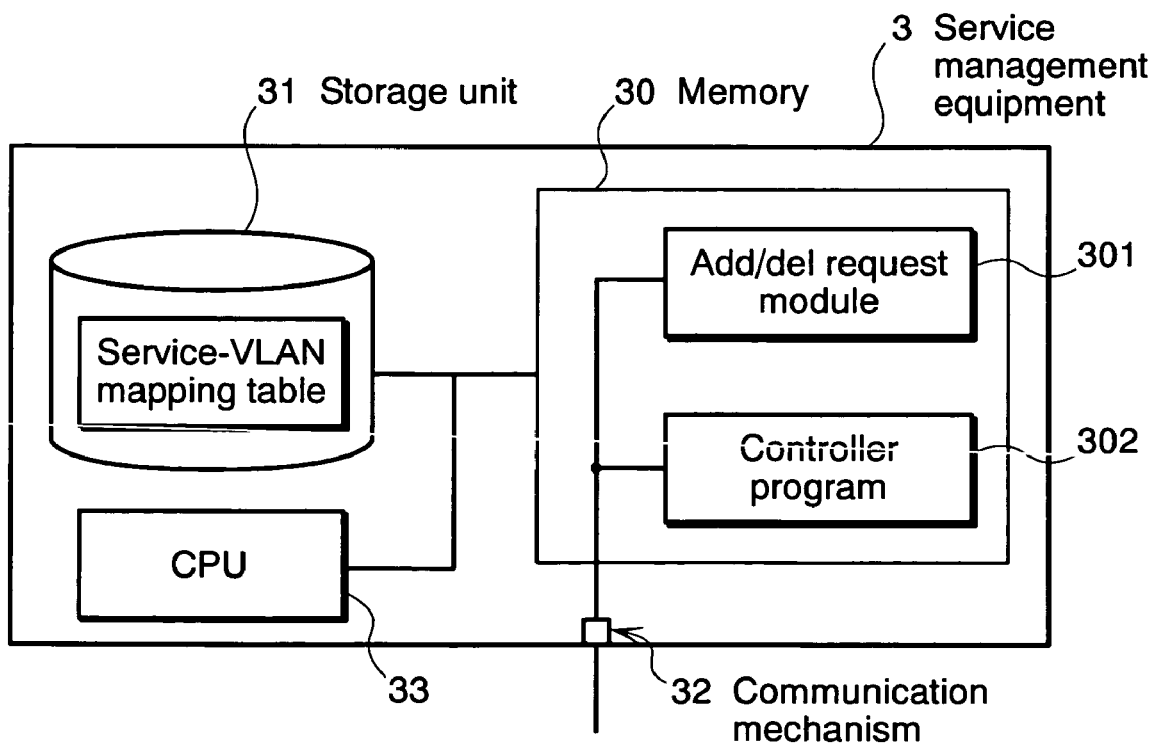
FIG. 5 is a diagram showing a format of a monitored port list of the first embodiment.
FIG. 6 is a diagram showing a configuration of a service management equipment of the first embodiment.

FIG. 5 shows an exemplary format of the monitored port list of the first embodiment.

The monitored port list includes sets of network switch ID to identify the network switches 4 and port numbers.

A string uniquely identifying the network switch 4 is used for the network switch ID. For example, MAC address for the management port 41 of the network switch 4, IP (Internet Protocol) address, a name specific to the network switch 4, and the like are used. The port number indicates a range of one or more port numbers of the network switch 4. The monitored port list is registered in advance by the VLAN management system administrator via an input unit not shown.

In the example of FIG. 5, for the network switch 4 whose network switch ID is SW1, the number of port numbers of ports to which the managed server 6 is allowed to be connected is 8, from 0/0 to 0/7.

Similarly, for the network switch 4 whose network switch ID is SW2, the number of port numbers of ports to which the managed server 6 is allowed to be connected is 17, from 0/0 to 0/16.

When the add/del request accept module 201 of the VLAN management equipment 2 in FIG. 2 communicates with external equipment, the communication is performed by means of the communication mechanism 25. Similarly, the link down/up detect module 202, FDB retrieve module 203, and VLAN info retrieve/configure module 204 perform the communication with external equipment via the communication mechanism 24, and the mirroring info retrieve/configure module 205 does the same via the communication mechanism 23. The controller program 206 communicates with external equipment by means of one of the communication mechanisms 23 to 25.

Service Management Equipment Configuration:

Next, an exemplary configuration of the service management equipment 3 is described below with reference to FIG. 6.

FIG. 6 is a diagram showing a configuration of the service management equipment of the first embodiment.

The service management equipment 3 is equipment for managing the correspondence between services and VLANs, and that function is implemented by, for example, the CPU 33 and programs running on the CPU 33.

The service management equipment 3 includes the memory 30, storage unit 31, communication mechanism 32, and CPU 33.

When the service management equipment 3 is activated, the add/del request module 301 and controller program 302 are read out to the memory 30, and executed by the CPU 33. The storage unit 31 holds a service-VLAN mapping table.

The add/del request unit 301 communicates with the VLAN management equipment 2, and sends an add request to add a managed server 6 to the VLAN management system 2 or a delete request to delete a managed server from the VLAN management system 2. These add request and delete request packets contain VLAN IDs.

Here, the add request is a packet that contains the information (VLAN ID) on the VLAN to which a managed server 6 is additionally connected, and is input to make a request to the VLAN management equipment 2 for connection thereof. This causes a firstly activated managed server 6 to be connected after the add request is sent.

Also, the delete request is a packet that contains the information (VLAN ID) on a managed server 6 to be deleted from the belonging VLAN, and is input to make a request to the VLAN management equipment 2 for disconnection from the managed server side port. This causes a firstly stopped managed server 6 to be disconnected from the VLAN indicated by the VLAN ID (i.e., disconnected from the managed server side port).

Referring to FIGS. 1 and 7, an exemplary format of the service-VLAN mapping table of the first embodiment is described below.

FIG. 7 shows a format of the service-VLAN mapping table of the first embodiment.

The service-VLAN mapping table consists of at least one set of service name and VLAN ID. The service name is a list of services operating on the VLAN management system.

In the service-VLAN mapping table, the VLAN ID corresponds one-to-one with the service-name. That is, it is necessary to allocate a different VLAN ID to a different service. This is because this embodiment requires one-to-one correspondence of service and VLAN. A managed server 6 providing no services is made to belong to a different VLAN from those to which managed servers 6 providing the other services, by isolating this managed server from the VLAN, making it belong to a VLAN providing no services, or the like. Generally, belonging to a VLAN providing no services is referred to as belonging to an idle VLAN.

This service-VLAN mapping table is stored in the storage unit 31 of the service management equipment 3, and generated, for example, in the following method:

(1) Services and VLAN IDs are mapped by the administrator of the VLAN management system 1. Specifically, the mapping table is created by editing service data via the I/O unit 22 of the VLAN management equipment 2, or the like.

(2) If an existing VLAN management system 1 is to be managed by the VLAN management equipment 2, the VLAN management equipment 2 collects a list of VLAN IDs existing within managed VLAN management system 1. In this case, the administrator inputs VLAN IDs via the I/O unit 22 of the VLAN management equipment 2 to create the mapping table so that service names one-to-one correspond with VLAN IDs collected by the VLAN management equipment 2.

(3) If plural VLAN management systems are newly configured, a list of services is input by the administrator via the I/O unit 22 of the VLAN management equipment 2. Then, the administrator allocates an unused new VLAN ID to each service via the I/O unit 22 of the VLAN management equipment 2.

These generation methods (1) to (3) can be used in combination. For example, it is possible to create a service-VLAN mapping table of an existing VLAN management system 1 using method (2), and then add a new system using method (1) or (3).

The service-VLAN mapping table input to the VLAN management equipment 2 is sent to the storage unit 31 of the service management equipment 3, in which the table is stored.

Also, it is possible for the user to input the service-VLAN mapping table directly to the storage 31 of the service management equipment 3 via the I/O unit of a service management equipment 3 not shown here. In this case, input methods are the same as described above.

Although the service management equipment and the VLAN management equipment are different equipment in this embodiment, the service management equipment 3 and VLAN management equipment 2 may be integrated into single VLAN management equipment 2.

Also, when each unit of the service management equipment 3 communicates with external equipment, the communication is performed through the communication mechanism 32.

Network Switch Configuration:

Now, an exemplary configuration of the network switch 4 is described below with reference to FIGS. 1 and 8.

FIG. 8 is a diagram showing a configuration of the network switch of the first embodiment.

The network switch 4 includes a memory 40, a management port 41, a network port 42, and a CPU 43. As the network switch 4, for example, an Ethernet switch is used.

When the network switch 4 is activated, the control processor 401 and the status advice module 402 are read out to the memory 40, and the CPU 43 executes them.

The control processor 401 performs such processing as controlling packet forwarding in the network, and is typically composed of a microprocessor or the like which is capable of executing programs. The control processor 401 decides which port a packet received at each port is to be forwarded to. The port to which the packet is forwarded is decided according to the configuration of virtual networks or mirroring. This configuration allows the forwarding a copy of the received packet to a specific mirrored port and the limiting the port to which the packet is forwarded. Furthermore, the control processor 401 can obtain the status of equipment connected to each network port 42, i.e., whether the link is on or off.

The status advice module 402 has a function that, as soon as the status of a communicating managed server changes, informs the other managed servers 6 of the status change through the managing port 41.

Specifically, a link down/up detection advice is transmitted according to the status of the managed server 6.

The management port 41 is used for communications between the control processor 401 of the network switch 4 and the managed server 6. Through this management port 41, the managed server 6 configures the functions of the control processor 401 and retrieves the information.

The network port 42 terminates a line connecting the managed server 6 and network switch. Practically, a network cable is inserted in the network port 42.

When the VLAN management equipment 2, the system disk deployment server 5, and the managed server 6 communicate with each other, the communications are to be performed through the network switch 4, and hereinafter the phrase "through the network switch 4" is omitted.

System Disk Deployment Server Configuration:

Now, an exemplary configuration of the system disk deployment server is described below with reference to FIGS. 1 and 11 as well as FIG. 9.

Figure 9:
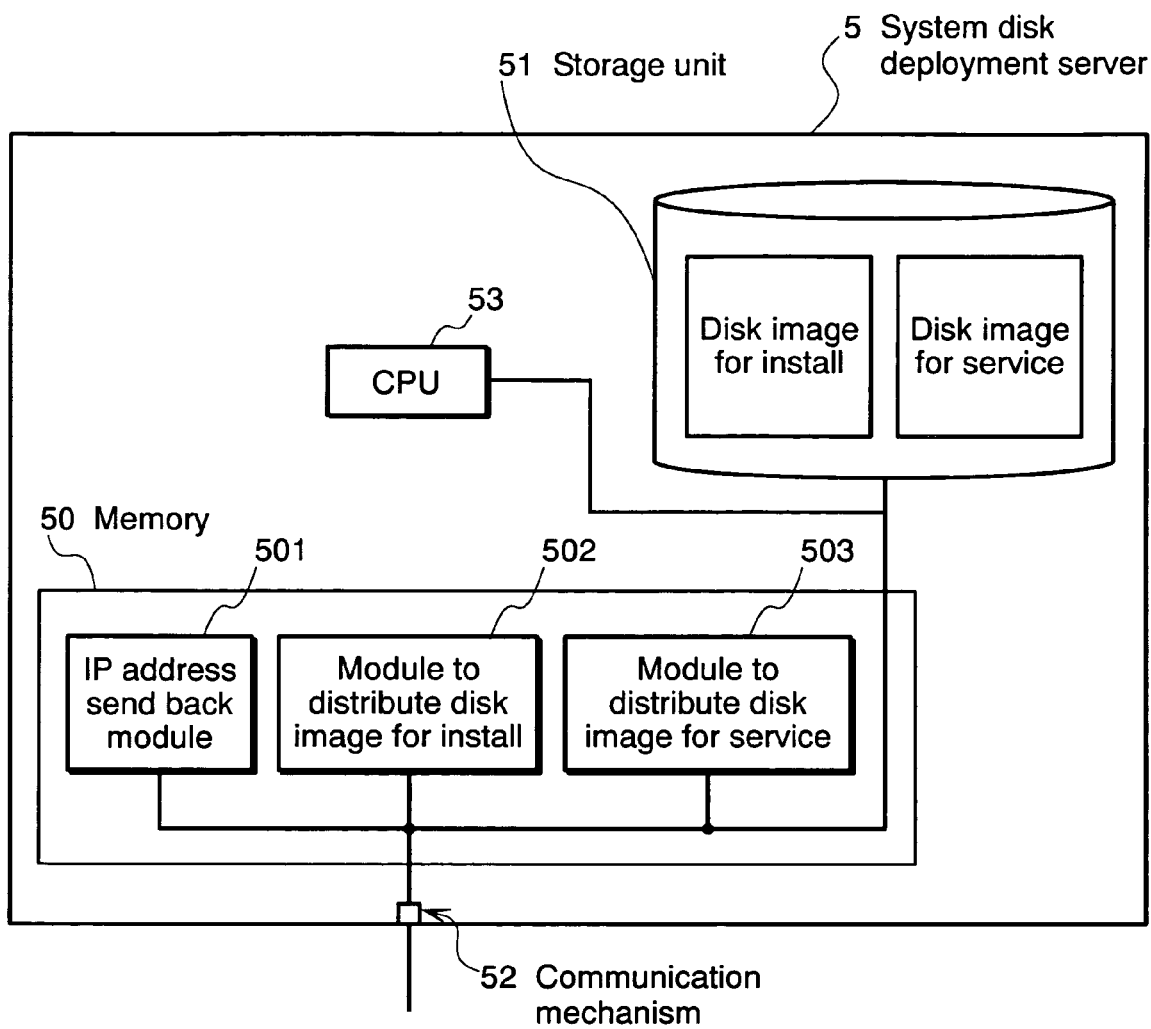
FIG. 9 is a diagram showing a configuration of a system disk deployment server of the first embodiment.

FIG. 9 is a diagram showing a configuration of the system disk deployment server of the first embodiment.

In the VLAN management system 1, every VLAN has one system disk deployment server 5. That is, one system disk deployment server 5 is provided for each service.

The system disk deployment server 5 is implemented by, for example, a computer and software programs or the like running thereon. The system disk deployment server 5 receives a request for a disk image sent from a managed server 6 within the VLAN to which the system disk deployment server 5 belongs, through a port of the network switch 4. Requests sent from managed servers 6 on the other VLANs or idle VLANs are not received.

Each system disk deployment server 5 is provided with a memory 50, a storage unit 51, a communication mechanism 52, and a CPU 53, and when the system disk deployment server is activated, the IP address send-back module 501, the module to distribute disk image for install 502, and the module to distribute disk image for service 503 are read out to the memory 50 and executed by the CPU 53.

Also, the system disk deployment server 5 is connected to the network switch 4 via the communication mechanism 52. When each unit of the system disk deployment server 5 communicates with external equipment, the communications are performed via the communication mechanism 52.

Furthermore, the storage unit 51 connected to the memory 50 holds disk images for install and disk images for service.

The IP address send back module 501 distributes, via the control processor 401 of the network switch 4, a response to an IP address advice request containing its own IP address and the information required for downloading each disk image, in response to an IP address advice request sent from a managed server 6.

The module to distribute disk image for install 502 has a function to distribute disk images for install via the network. Also, when a request to retrieve a disk image for install is received from a managed server 6, this module 502 also has a function to distribute the disk image for install to the requesting managed server in response. When the disk image for install is loaded on the managed server 6 and executed, the OS for install contained in the disk image for install runs.

Although the system disk deployment server 5 and the storage unit 51 are integrated, they may be separated.

Figure 10:
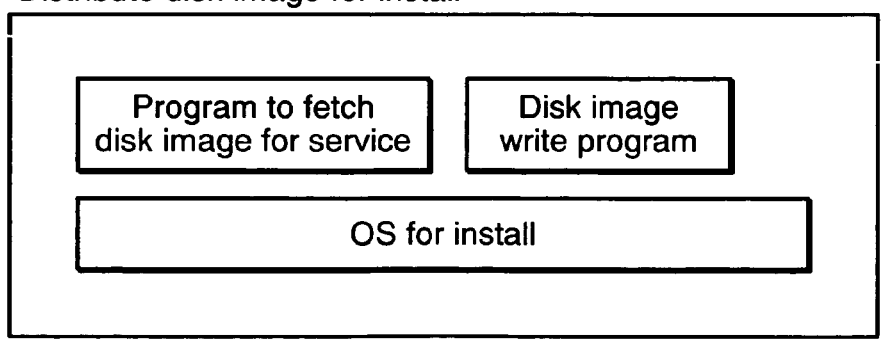
FIG. 10 is a conceptual diagram of a disk image for install of the first embodiment.

FIG. 10 is a conceptual diagram of the disk image for install of the first embodiment.

The disk image for install is an image that is distributed to the managed server 6 and installed. The disk image for install includes an OS for install, a program to fetch disk image for service, and a disk image write program. The OS for install is an operating system that, when distributed to a managed server 6, runs on that managed server 6. The OS for install executes the program to retrieve disk image for service and the disk image write program sequentially. The operation of each program is described later with reference to FIG. 15.

Referring again to FIG. 9, the module to distribute disk image for service 503 has a function that, when a request to fetch disk image for service sent from the program to fetch disk image for service in the install programs contained in the disk image for install is received via the network, distributes the disk image for service to the managed server 6. When the managed server 6 loads and executes the disk image for service, the OS for service is activated.

The disk image for service is a copy of the system environment for processing services of a managed server 6. Booting this managed server 6 after copying the disk image for service to a hard disk drive of the managed server 6 causes the managed server 6 to start the service using the installed OS for service, creating an environment for providing the service.

The disk image for install and the disk image for service are stored in the storage unit 51 of the system disk deployment server 5. Specifically, they are stored as files, for example. The disk image for service needs to be created by the administrator before activating the VLAN management system 1. The disk image for service may be created in any method, such as copying a disk image on a managed server 6 set up for service and rewriting only unique information on an operating managed server 6, such as IP addresses.

The system disk deployment server 5 is not connected to an idle VLAN.

Managed Server Configuration:

The managed server 6 is described below with FIGS. 1 and 11.

Figure 11:
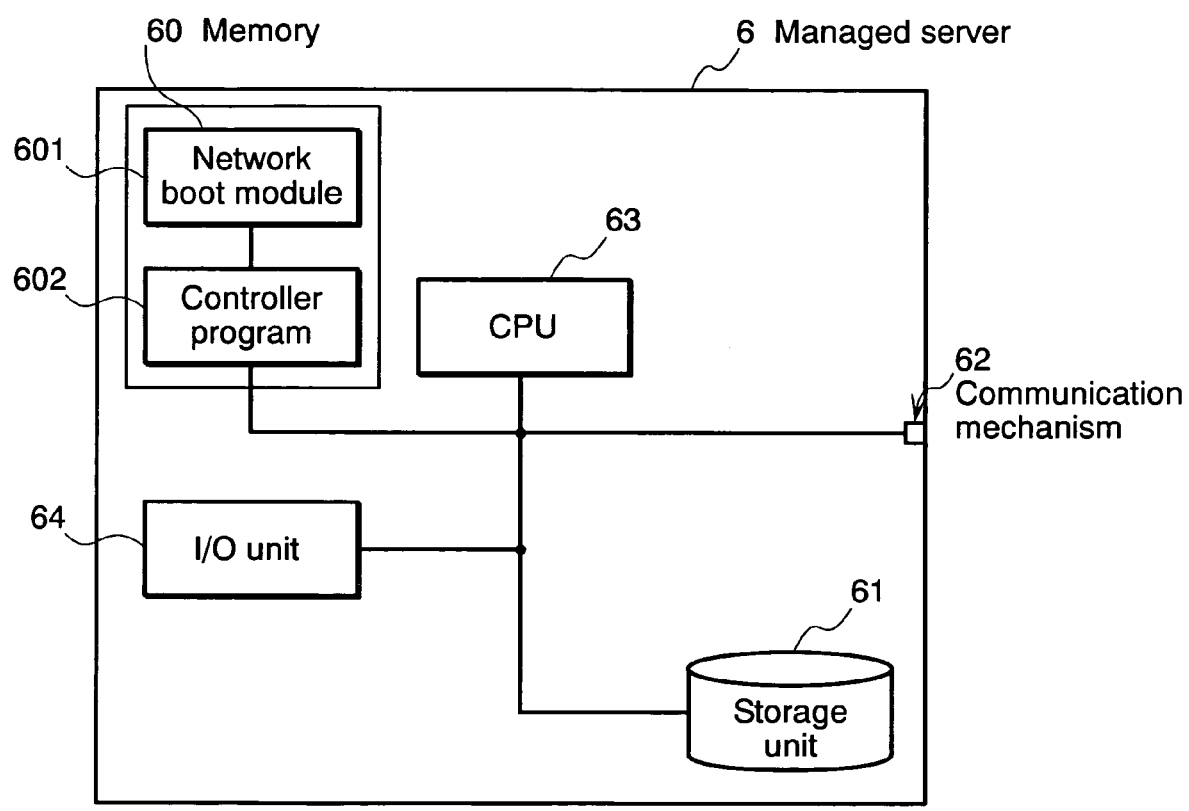
FIG. 11 is a diagram showing a configuration of a managed server.

FIG. 11 shows an exemplary configuration of the managed server 6 of the first embodiment.

The managed server 6 is a computer to provide services. All the managed servers 6 within the VLAN management system 1 have the same performance and specification. The VLAN management system 1 of this embodiment manages a group of managed servers 6 having such a uniform function as providing a plurality of different services with one blade server system.

The managed server 6 is connected through the network port 42 to the network switch 4.

The managed server 6 includes a memory-60, a CPU 63, a storage unit 61, an I/O unit 64 to input/output information, and a communication mechanism 62 to communicate with the network switch 4. When the managed server 6 is activated, a network boot module 601 and a controller program 602 are read out to the memory 60 and executed by the CPU 63.

When these units communicate with external equipment, the communications are performed through the communication mechanism 62.

The network boot module 601 has a function to perform a network boot. The network boot is a function that, when loading the OS to be executed to start the managed server 6 into the managed server 6, downloads the disk image for boot from the system disk deployment server 5 and uses that disk image, instead of using the disk image on a hard disk drive within the managed server 6. In this embodiment, the specifications of the PXE boot, a function of the PXE (Preboot eXecution Environment) technology, is described as an example of the network boot, but other network boots may be used.

In the VLAN management system 1 of this embodiment, all the managed servers 6 in the VLAN management system 1 perform the configuration of the hardware controller and the setup of the software appropriately, enabling any service that operates in the VLAN management system 1 to be provided. In other words, all the managed servers 6 in the VLAN management system 1 have the same functions and can process any service.

Hereafter, the processes of adding and deleting a managed server 6 to and from the VLAN management system 1 of the first embodiment are described.

Process of Adding a Managed Server Entire System:

The flow of the process of adding a managed server to the VLAN management system of the first embodiment is described below with reference to FIGS. 1 to 11 as well as FIG. 12.

Figure 12:
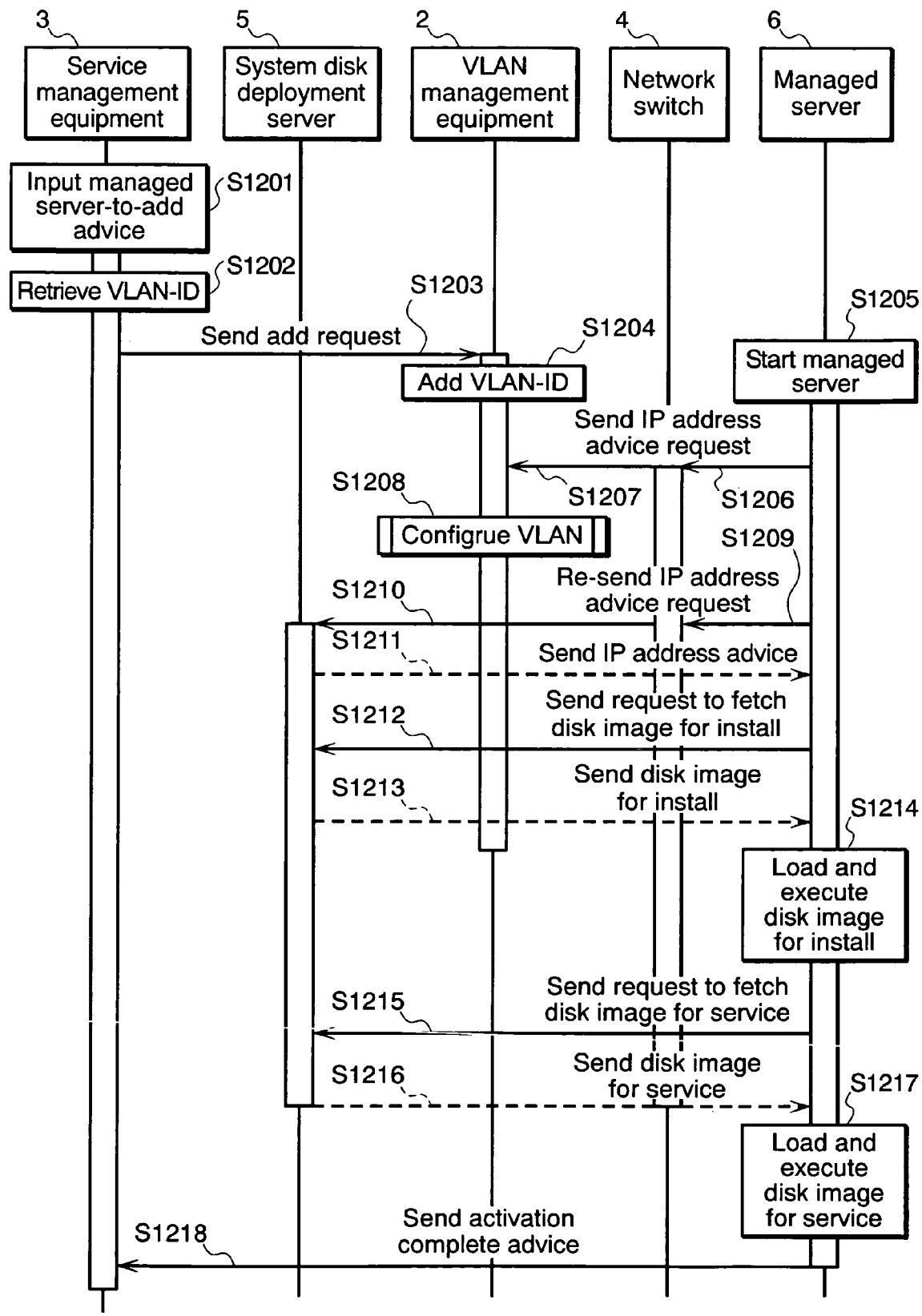
FIG. 12 is a timing chart showing a process flow of adding a managed server to a VLAN management system of the first embodiment.

FIG. 12 is a timing chart showing the flow of the process of adding a managed server 6 to the VLAN management system of the first embodiment.

First, the administrator inputs a managed server add advice to the controller program 20 of the service management equipment 3 (S1201). Specifically, the managed server add advice is done by entering the name of a service for which the managed server 6 is added, to the service management equipment 3. This entry is made via a human-operable interface or an interface operated by the commands from an external program or the like using a communication means. Also, this add advice entry may be made by means of the I/O unit 22 of the VLAN management equipment 2 or the I/O unit 64 of the managed server 6. Examples of operating with commands include selecting service name on a GUI screen and clicking a button to add a managed server 6, executing a command line program to start the adding of a managed server 6, and opening a programming interface for socket communication to send a command to add a managed server 6.

Then, the controller program 302 searches the service-VLAN mapping table stored in the storage unit 31 using the service name as a key, to retrieve a corresponding VLAN ID (S1202).

When the add/del request module 301 obtains this VLAN ID from the controller program 302, an add request containing the obtained VLAN ID is sent to the add/del request accept module 201 of the VLAN management equipment 2 (S1203).

When the add/del request accept module 201 obtains the VLAN ID from the received add request, the VLAN ID received is added to the VLAN ID-to-add queue (S1204).

Next, the managed server 6 is connected to the network port 42 of the network switch 4 belonging to an idle VLAN, and this managed server 6 is turned on to activate (S1205). Activating the managed server 6 can be done in any method. For example, a method in which the administrator manually connects a managed server 6 to the VALN management system 1 and then manually turns on this managed server 6, or a method in which the administrator uses a management module hardware for managing the turning on/off of a managed server 6 to obtain the status of the power supply and randomly selects one of the off-status managed servers to turn on, is conceivable. If a managed server 6 not belonging to an idle VLAN is activated, steps S1208 or more will not be done. This means that a managed server 6 not belonging to an idle VLAN is not regarded as a managed server 6 to be added.

The network boot module 601 of the managed server 6 that has been turned on sends an IP address advice request to the network switch 4 (S1206). This request is forwarded only to idle VLANs. Since the system disk deployment server 5 is not connected to an idle VLAN, IP address is not returned in response to the IP address advice request from the system disk deployment server 5, thus resulting in timeout. This IP address advice request contains the MAC address of the network interface of the managed server 6.

Then, the control processor 401 of the network switch 4 assigns its own network switch ID to the IP address advice request received at the network port 42, and copies to the mirrored port (in this embodiment, the management port 41 of the network switch 4) to send it to the VLAN management equipment 2 (S1207). The mirroring info retrieve/configure module 205 of the VLAN management equipment 2 receives the IP address advice request via the management port 41.

The VLAN management equipment 2 analyzes the received IP address advice request, and configures so that the network port 42 that received the IP address advice request belongs to the VLAN identified by the VLAN ID received from the service management equipment 3 at step S1203 (S1208). The details of step S1208 is described later with reference to FIG. 13.

The network boot module 601 of the managed server 6 sends again an IP address advice request containing the MAC address of its own network interface to the network switch 4, after the IP address advice request sent at step S1206 resulted in timeout (S1209). Furthermore, the control processor 401 of the network switch 4 assigns its own network switch ID to the received IP address and sends it to the IP address send back module 501 of the system disk deployment server (S1210). The network port 42 of the network switch 4 configured at step S1208 belongs to the VLAN for the service specified at step S1201. Therefore, the IP address advice request retransmitted at step S1209 is sent to the IP address send back module 501 of the system disk deployment server 5 belonging to this VLAN.

The IP address send back module 501 that received the IP address advice request sends a response to the IP address advice request to the managed server 6 according to the MAC address of the managed server 6 contained in the received IP address advice request (S1211). The IP address includes the information to specify the system disk deployment server 5 within the VLAN.

Then, the network boot module 601 of the managed server 6 sends a request to retrieve disk image for install containing its own IP address, to the system disk deployment server corresponding to the information in the received IP address that specifies the system disk deployment server 5 (S1212).

And, the module to distribute disk image for install 502 of the system disk deployment server 5 retrieves the disk image for install from the storage unit 51 according to the IP address of the managed server 6 included in the IP address retrieve request, and sends it to the network boot module of the managed server 6 (S1213).

Next, the network boot module 601 of the managed server 6 loads the disk image for install received at step S1213 in the memory, and executes it (S1214). In addition, this module sends a request to retrieve disk image for service containing its own IP address to the system disk deployment server 5, according to the program to retrieve disk image for service in the OS for install that is installed by the disk image for install (S1215).

The module to distribute disk image for service 503 of the system disk deployment server 5 sends the disk image for service to the requesting managed server 6, according to the IP address contained in the received request to retrieve disk image for service (S1216).

The network boot module 601 of the managed server 6 installs the received disk image for service (S1217).

Retrieval of the disk image for service can be done in any method of communicating data by means of network communication. This includes file transfer using the FTP (File Transfer Protocol) and the NFS (Network File System).

Then, the network boot module 601 restarts itself using the installed disk image for service. After this module started, the controller program 602 of the managed server 6 sends an activation complete advice to the service management equipment 3 via the network switch 4 (S1218). The service management equipment 3 informs the operation administrator of the completion of server activation.

VLAN Configuration Process: VLAN Configuration Equipment

Now, the flow of the VLAN configuration process at step 1208 is described below with reference to FIGS. 1 to 10 as well as FIG. 13.

Figure 13:
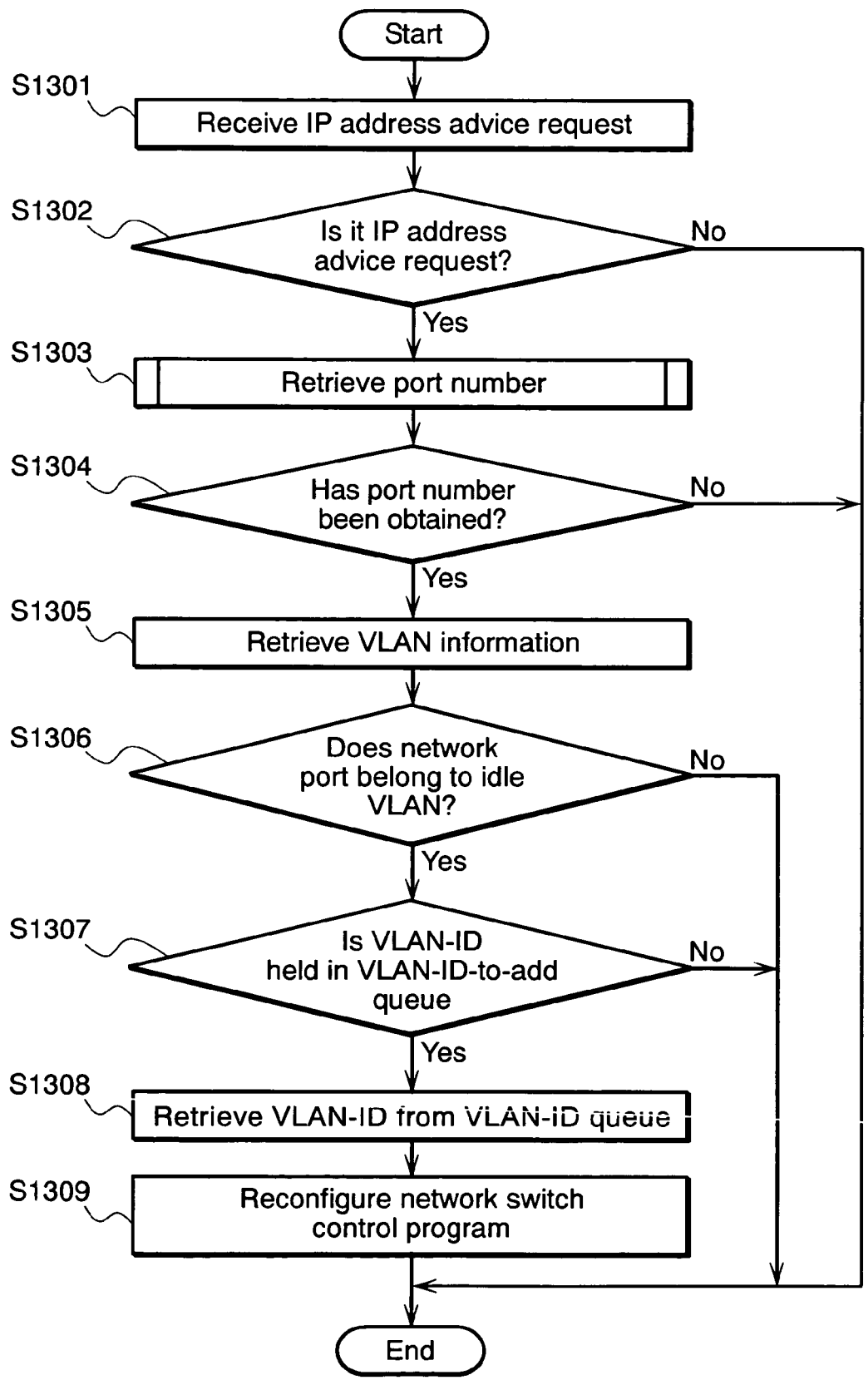
FIG. 13 is a flowchart showing the VLAN configuration process at step S1208 of FIG. 12.

FIG. 13 is a flowchart showing the flow of the VLAN configuration process at step S1208 in FIG. 13.

First, the mirroring info retrieve/configure module 205 of the VLAN management equipment 2 receives an IP address advice request mirrored by the network switch 4, via the management port 41 of the network switch 4 (S1301). At this time, since practically all the packets are received, packets other than the IP address advice request are also received by the mirroring info retrieve/configure module 205.

Next, the controller program 206 determines whether or not each of the received packets is an IP address advice request (S1302). This can be realized by comparing a specific byte sequence in the payload of a received packet and the pattern of the IP address advice request, and determining whether or not they match. If none of the received packets is the IP address advice request ("No" at S1302), it is regarded as absence of the IP address advice request and the process is terminated.

If the controller program 206 determines that a received packet is the IP address advice request ("Yes" at S1302), the VLAN management equipment 2 retrieves the port number of the network switch 4 that received the IP address advice request (S1303). The details of step S1303 is described later with reference to FIG. 14.

Next, the VLAN management equipment 2 determines whether or not the port number is obtained at step S1303 (S1304). If the port number is not obtained ("No" at S1304), it is regarded as an error and the process is terminated.

If the port number is obtained ("Yes" at S1304), the VLAN info retrieve/configure module 204 of the VLAN management equipment 2 retrieves the VLAN information on the VLAN to which a port corresponding to the port number, from the control processor 401 of the network switch 4 (S1305).

Furthermore, the controller program 206 refers to the monitored port list held in the storage unit 21, using the port number obtained at step S1303 as a key, and determines whether or not a network port 42 corresponding to the obtained port number belongs to an idle VLAN (S1306).

Judgment of whether or not a VLAN is idle is made by the FDB retrieve module 203, by obtaining the port number of a network port that belongs to the VLAN corresponding to the VLAN ID stored in the VLAN information obtained at step S1305, and determining whether or not a network port 42 corresponding to this port number is connected to the system disk deployment server 5.

If the ports of the network switch belonging to an idle VLAN are registered previously with the VLAN management equipment 2 by the administrator, it is possible to determine whether or not a particular managed server 6 belongs to an idle VLAN.

If the network port 42 does not belong to an idle VLAN (i.e., belongs to a VLAN allocated to a service) ("No" at S1306), this managed server 6 is regarded as being not a managed server to be added, and the process is terminated.

At step S1306, if it is determined that the port belongs to an idle VLAN at step S1306 ("Yes" at S1306), the controller program 206 refers to the VLAN ID-to-add queue to determine whether or not any VLAN ID is held in this queue (S1307).

As a result of the judgment, if no VLAN ID exists in the VLAN ID-to-add queue ("No" at S1307), it is regarded as absence of the managed server 6 currently requested to add, and the process is terminated.

As a result of the judgment, if a VLAN ID exists in the VLAN ID-to-add queue ("Yes" at S1307), the controller program 206 retrieves one VLAN ID from this queue (S1308).

Also, the VLAN info retrieve/configure module 204 reconfigures the network switch 4 so that the port number obtained at step S1303 belongs to the VLAN identified by the VLAN ID obtained at step S1308 (S1309).

Port Number Retrieval: VLAN Management Equipment

The flow the process of retrieving the port number at step S1303 in FIG. 13 is described below with reference to FIGS. 1 to 10.

Figure 14:
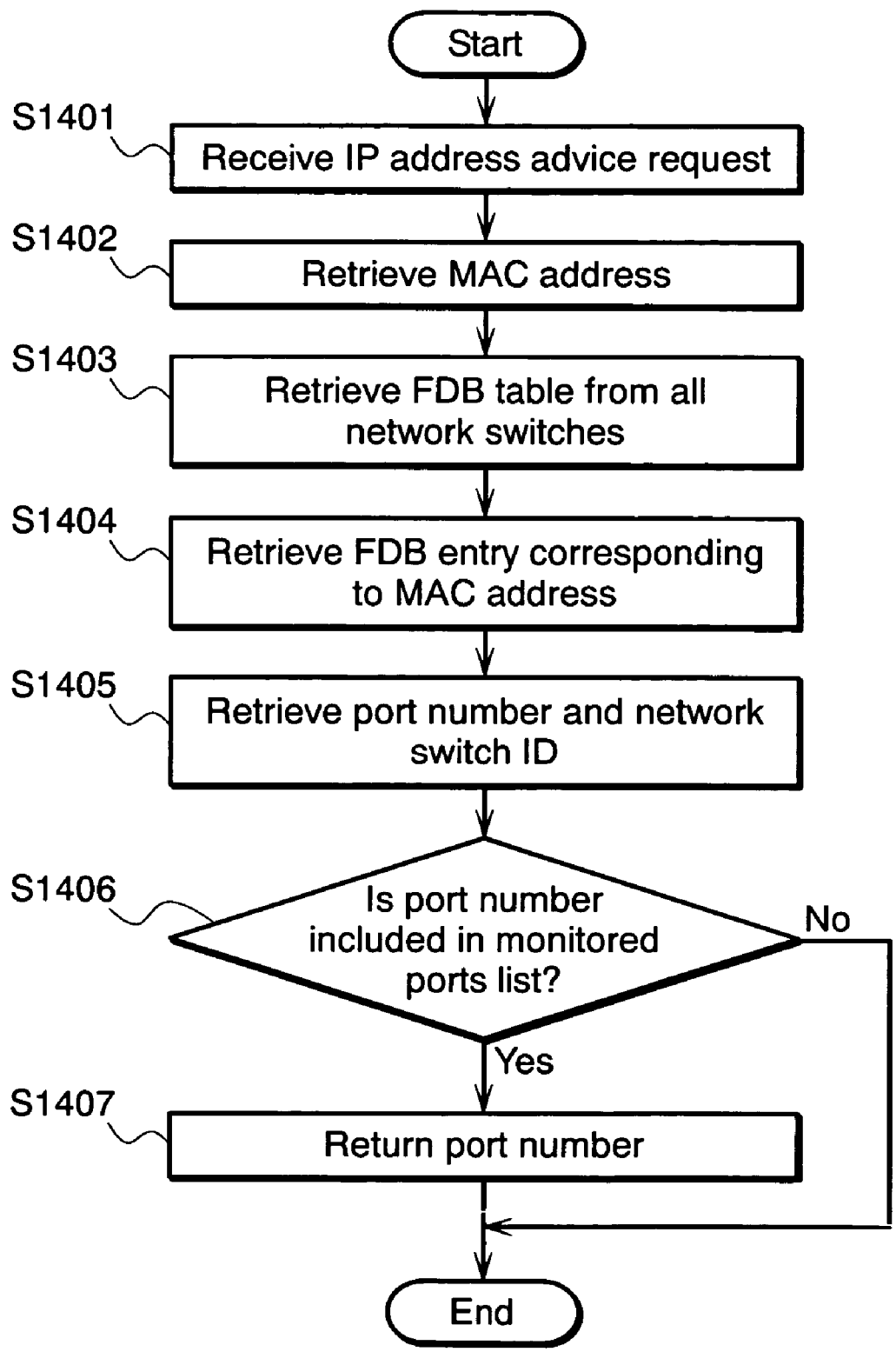
FIG. 14 is a flowchart showing the port number fetch process at step S1303 of FIG. 13.

FIG. 14 is a flowchart showing the flow of the port number retrieval process at step S1303 in FIG. 13.

Prior to the process, a network switch ID list is registered with the storage unit 21 of the VLAN management equipment 2 via, for example, the I/O unit 22.

First, the mirroring info retrieve/configure module 205 receives an IP address advice request (S1401).

Next, the controller program 206 obtains a MAC address from the IP address advice request received at step S1401 (S1402). The MAC address is written to a particular location in the IP address advice request, and the MAC address can be obtained by referring to this location.

Then, the FDB retrieve module 203 obtains an FDB table from the control processor 401 for all the network switches 4 being managed by the VLAN management equipment 2, based on the network switch IDs held in the network switch ID list of the storage unit 21 (S1403).

The controller program 206 then searches the FDB tables of all the network switches under the management of the VLAN management equipment 2, using the MAC address obtained at step S1402 as a key, retrieves an entry corresponding to that MAC address (hereinafter referred to as FDB entry) (S1404), and obtains the port number of the managed server side port in the corresponding FDB entries and the network switch ID of the network switch 4 when that managed server side port was searched (S1405).

Next, the controller program 206 determines whether or not the port number obtained at step S1404 is included in the corresponding network switch ID entries of the monitored port list (S1406). If the port number is not included in the corresponding network switch ID field ("No" at S1406), the controller program 206 regards the obtained port number as being not to be managed, and terminates the process.

In the VLAN management system 1, for example, containing multi-staged network switches 4, the FDB table for the managed server 6 is created in both of the network switch 4 of the VLAN management equipment 2 and the network switch 4 of the managed server 6.

Since there is no method of confirming that a managed server 6 is connected to the network switch 4 at this time, the controller program 206 uses the monitored port list to identify the network port 42 to which a managed server is connected.

In such a case, if a set of network ID and port number is not included in the monitored list ("No" at S1406), the controller program 206 regards as "the FDB table from which the port number was obtained is an FDB table indicating the forwarding routes to other switches", and terminates the process.

If the port number is included in the network switch ID field ("Yes" at S1406), the controller program 206 returns the port number obtained at step S1404 to the network switch 4 (S1407).

Disk Image Retrieval: Managed Server

The flow of the process of retrieving each disk image by the managed server 6 is described below with reference to FIGS. 1 to 10.

Figure 15:
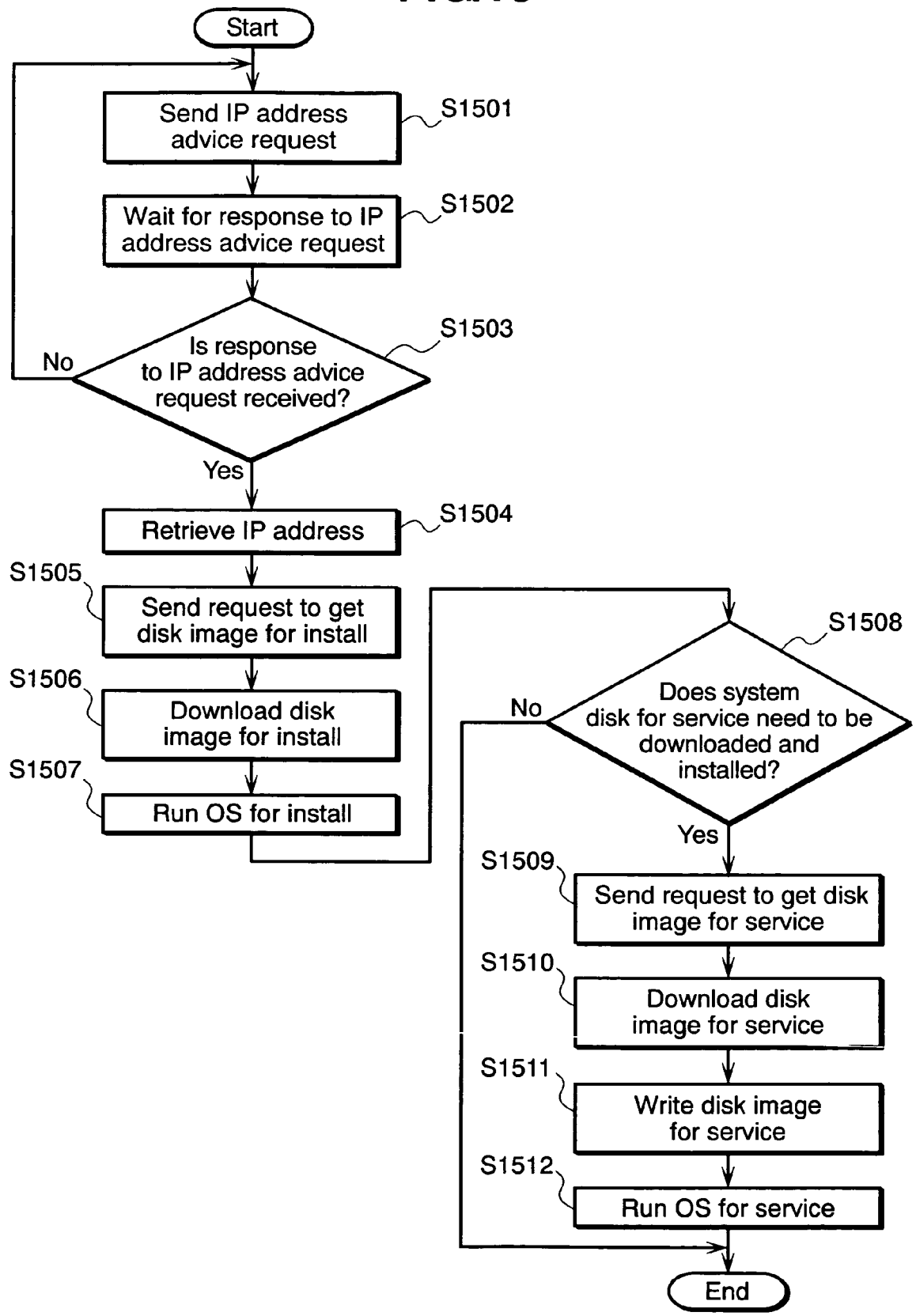
FIG. 15 is a flowchart showing a process of adding a managed server.

FIG. 15 is a flowchart showing the flow of the processing by the managed server 6 in the additional processing by the managed server.

First, the network boot module 601 in the managed server 6 broadcasts an IP address advice request containing the MAC address of its own network interface, to every system disk deployment server 5 in the network (S1501).

Next, the network boot module 601 waits for a response to the IP address advice request from the system disk deployment servers 601 for a predetermined period of time (Sl502).

At step S1503, the network boot module 601 determines whether or not a response to the IP address advice request is received.

As a result of the judgment at step S1503, if the network boot module 601 has not received a response to the IP address advice request ("No" at S1503), control returns to step S1501 and the network boot module 601 broadcasts again the IP address advice request.

As a result of the judgment at step S1503, if the network boot module 601 has received a response to the IP address advice request ("Yes" at S1503), control goes to step S1504.

If no response to the IP address advice request is received after the IP address advice request is sent certain times (not shown), the network boot module 601 regard it as a failure to obtain IP address and will not perform the subsequent processes, and terminate the process.

At step S1504, the network boot module 601 obtains the IP address of the source (IP address of the system disk deployment server 5) contained in the response to the IP address advice request obtained at step S1503.

Then, the network boot module 601 sends a request to retrieve disk image for install to the IP address obtained at step S1504 (S1505). This request contains IP address of the source, a managed server 6. The system disk deployment server 5 obtains the IP address of the managed server 6 included in the request to retrieve disk image for install, and sends the disk image for install to the managed server 6 having the obtained IP address, as a response to the request to retrieve disk image for install. In such a way, the network boot module 601 of the managed server downloads the disk image for install (S1506).

The network boot module 601 places the disk image for install downloaded at step S1506 on the memory 60 in the managed server 6, and executes the OS for install in that disk image for install (S1507).

Then, the managed server 6 determines whether or not a disk image for service needs to be downloaded from the system disk deployment server 5 and installed in itself (S1508). Specifically, it is accomplished by examining the difference between the disk image in the system disk of the managed server 6 and the disk image for service that should be downloaded. Examples of the difference examination method include a method of actually downloading the disk image for service and comparing every byte of the disk image in the system disk of the managed server 6 and disk image for service, a method of comparing the characteristic data of the two disk images, and a method of comparing the checksum of the two disk images. As a result, if it is determined that the image disk for service needs not to be installed ("No" at S1508), the process is terminated.

If it is determined that the downloading and installing of the disk image for service is necessary ("Yes" at S1508), the program to retrieve disk image for service contained in the OS for install for the disk image for install, which was executed at step S1507, sends a request to retrieve disk image for service containing its own IP address (Sl509). The system disk deployment server 5 that received this request sends the disk image for service to the managed server 6 by means of the FTP, NFS, or the like. Then, the program to retrieve disk image for service of the OS for install downloads the disk image for service (S1510).

Next, the network boot module 601 writes the disk image for service downloaded at step S1510 to a hard disk drive of the managed server 6 (S1511). This can be accomplished by writing the disk image for service directly to a specific block of the hard disk drive. In practical processing, step S1511 is carried out while performing step S1510. That is, the program to retrieve disk image for service of the OS for install writes the disk image for service forwarded to a temporary memory, while downloading the disk image for service.

The managed server 6 installs the downloaded disk image for service, and loads the OS for service contained in the disk image for service to execute (S1512).

Deletion of Managed Server 6: Entire System

The process of deleting a managed server 6 from the service is described below with reference to FIGS. 1 to 10 as well as FIG. 16.

Figure 16:
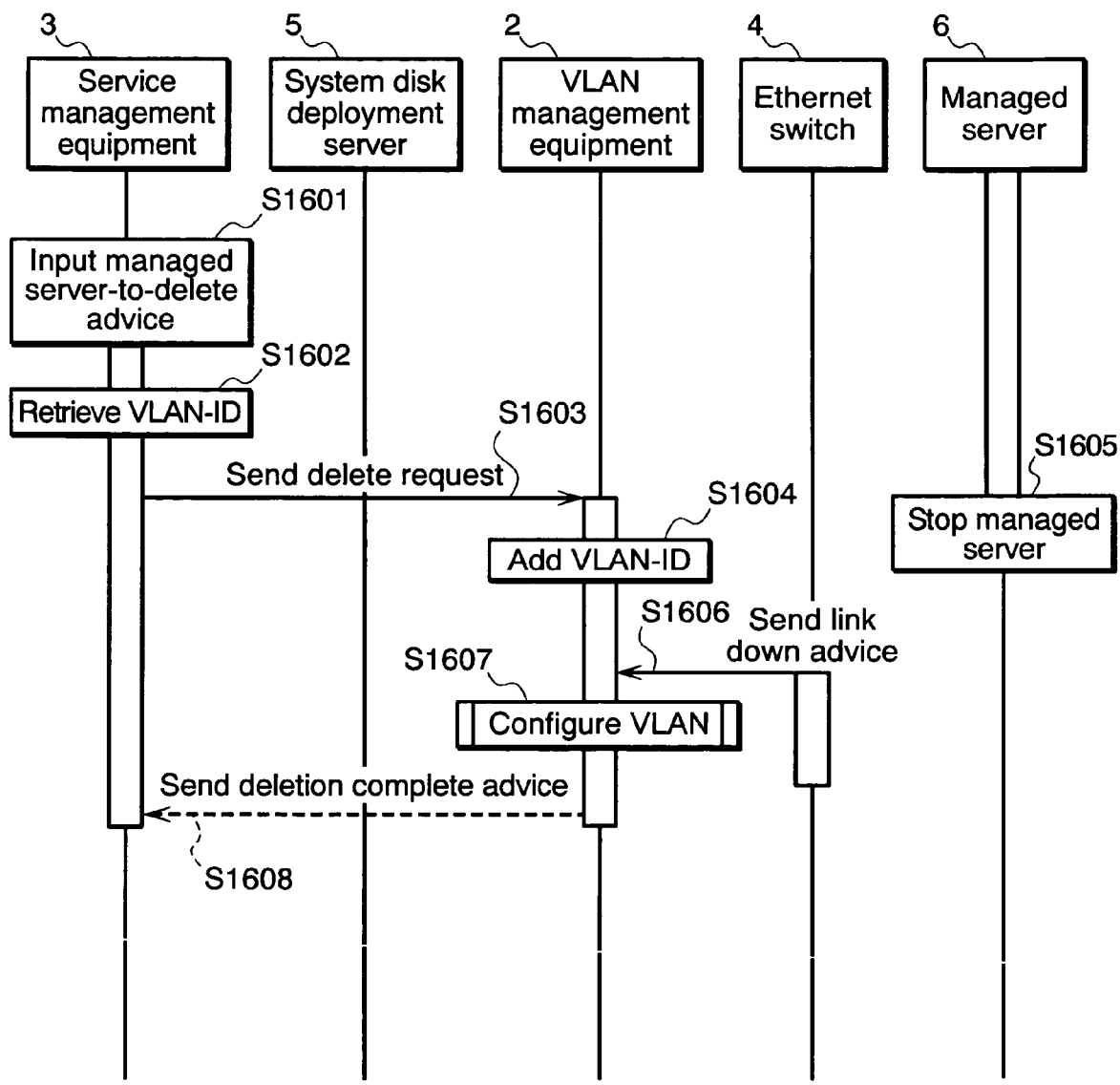
FIG. 16 is a timing chart showing a process of deleting a managed server from the service.

FIG. 16 is a timing chart of the process of deleting a managed server from the service.

First, the administrator inputs an advice of a managed server 6 to be deleted to the controller program 302 of the service management equipment 3 via the I/O unit 22 (S1601). Specifically, the administrator enters the name of a service from which the managed server 3 is to be deleted, to the controller program 302 of the service management equipment 3. The specific method of informing the deletion of a managed server 6 is the same as for adding a managed server 6 to the service.

Next, the controller program 302 searches the service-VLAN mapping table stored in the storage unit 31, using the entered service name as a key, and retrieves a VLAN ID corresponding to the entered service name (S1602).

Then, the controller program sends a delete request including the obtained VLAN ID to the add/del request accept module 201 of the VLAN management equipment 2 (S1603). The add/del request accept module 201 retrieves the VLAN ID included in the delete request, searches the VLAN ID-to-delete queue table using this VLAN ID as a key, and adds the received VLAN ID to the VLAN ID-to-delete queue for corresponding entries of the VLAN ID-to-delete queue table (S1604).

The managed server 6 to be deleted is stopped (S1605). Any method may be used to stop the managed server 6, as when starting the managed server 6. For example, such conventional methods as manually stopping by the administrator, or using management module for managing start and stop of the managed server 6 to turn off, may be used. If a managed server 6 not belonging to a VLAN specified by the VLAN ID was stopped, step S1607 described later is not performed. This means that this managed server 6 is not regarded as a managed server 6 to be deleted.

When the managed server 6 is stopped, a link down event occurs from the network port 42 of a network switch connected to the managed server 6. A link down advice generated in association with the link down event is sent from the status advise module 402 of the network switch 4 to the link down/up detect module 202 of the VLAN management equipment 2 (S1606). The link down advice contains the port number of the network port 42 where a link down event occurred.

When the link down/up detect module 202 receives a link down advice, the VLAN management equipment 2 performs the VLAN configuration (S1607) for the network switch 4. The details of step S1607 is described later with reference to FIG. 17.

Then, the controller program 206 sends a deletion complete advice from the service of the managed server to the service management equipment 3 (S1608).

Now, the flow of the VLAN configuration process at step S1607 in FIG. 16 is described with reference to FIGS. 1 to 10.

Figure 17:
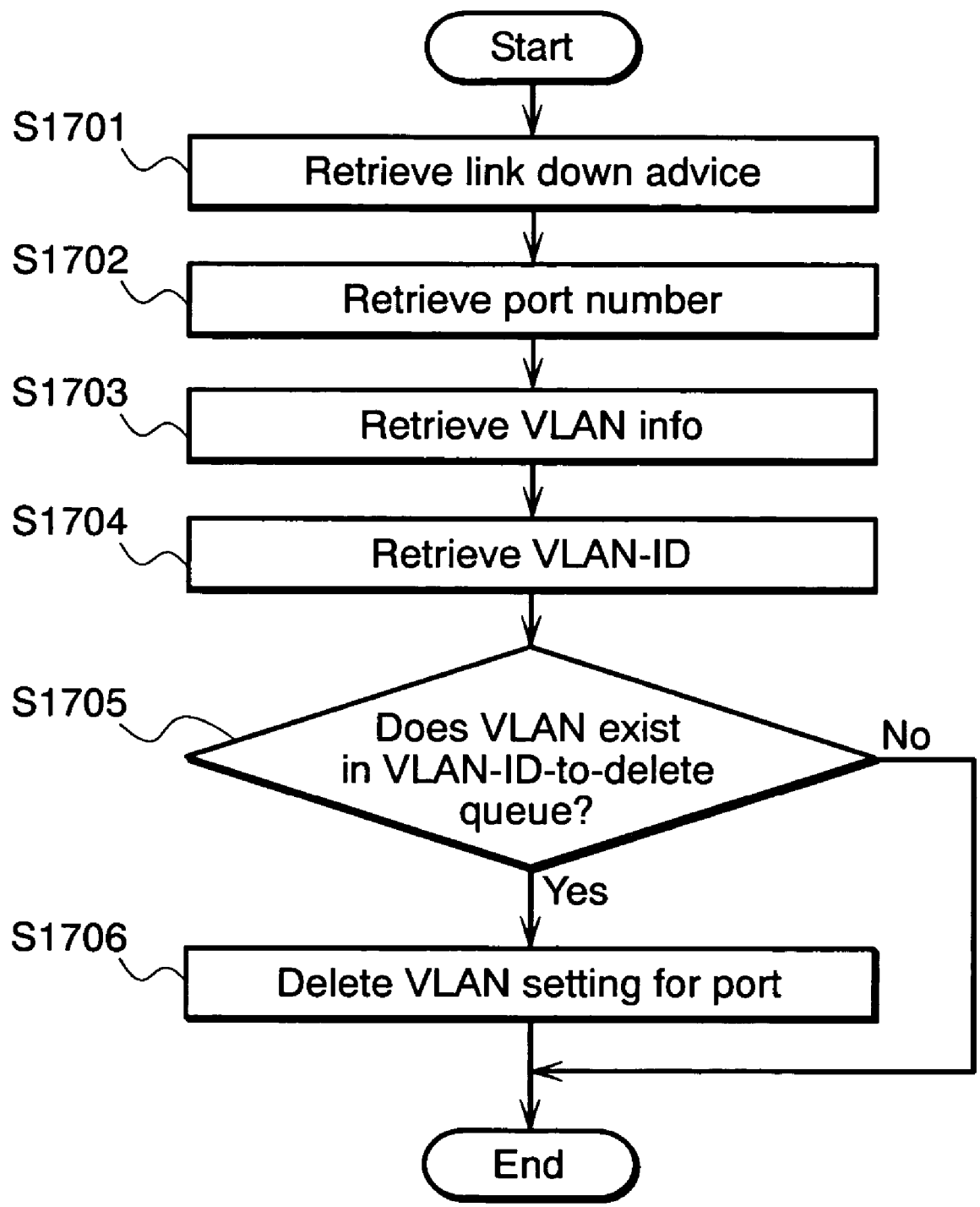
FIG. 17 is a flowchart showing the VLAN configuration process at step S1607 of FIG. 16.

FIG. 17 is a flowchart showing the flow of the VLAN configuration at step S1607 in FIG. 16.

The link down/up detect module 202 receives a link down advice of the network port 42 sent from the status advise module 402 of the network switch 4 (S1701). This link down advice contains the port number of the link-downed network port 42 (i.e., the network port connected to a stopped managed server).

Then, the link down/up detect module 202 obtains the port number of the network port 42 where the link down event occurred, from the link down advice received at step S1701 (S1702).

Next, the VLAN info retrieve/configure module 204 obtains the VLAN information from the control processor 401 of the network switch 4 (S1703). The VLAN information contains the VLAN ID of the VLAN set in the network switch 4 and the corresponding port number of the network port 42 belonging to this VLAN.

The controller program 206 of the VLAN management equipment 2 searches the VLAN information using the port number obtained as step S1702 as a key, and retrieves the corresponding VLAN ID (S1704).

Then, the controller program 206 searches the VLAN ID-to-delete queue using the obtained VLAN ID as a key, and determines whether or not the obtained VLAN ID exists in the VLAN ID-to-delete queue (S1705).

If there is no VLAN ID in the VLAN ID-to-delete queue ("No" at S1705), the controller program 206 considers that there is no need to delete the managed server from the service, i.e., no delete command is issued, and terminates the process.

If there is the VLAN ID in the VLAN ID-to-delete queue ("Yes" at S1705), control goes to step S1706.

At step S1706, The VLAN info retrieve/configure module 204 changes the setting in the control program 401 of the network switch 4 so that the port number obtained at step S1702 belongs only to an idle VLAN, to delete the VLAN setting for the corresponding port.

Changing the Use of a Managed Server:

To change the use of a managed server 6, it is enough to first delete a managed server 6 from a predetermined service according to the managed server delete procedure described above, and then add a managed server 6 to a service to be added according to the managed server add procedure also described above.

Second Embodiment

The second embodiment is intended for the VLAN management system wherein a managed server 6 has a plurality of network communication equipment. This embodiment is described using the NIC (Network Interface Card) as an example of the network communication equipment.

Since this embodiment includes the same elements and processing as in the first embodiment, such elements and processing are given the same numerals as used in the first embodiment to omit their descriptions, and the elements and processing characteristic of this embodiment will be described.

This embodiment is different from the first embodiment in the following points:

(1) The managed server 6 receives an IP address advice request at the IP address send back module 1801 in the VLAN management equipment 2a (refer to FIG. 18), instead of detecting at the mirroring info retrieve/configure module 204 (refer to FIG. 2).

(2) The module to distribute disk image for install 1802 of the VLAN management equipment 2a (refer to FIG. 8) sends a disk image for install to a managed server 6 and performs the VLAN configuration for all the NICs for the managed server 6.

This change allows the adding of a service to a managed server equipped with a plurality of NICs to be managed minutely.

Figure 18:
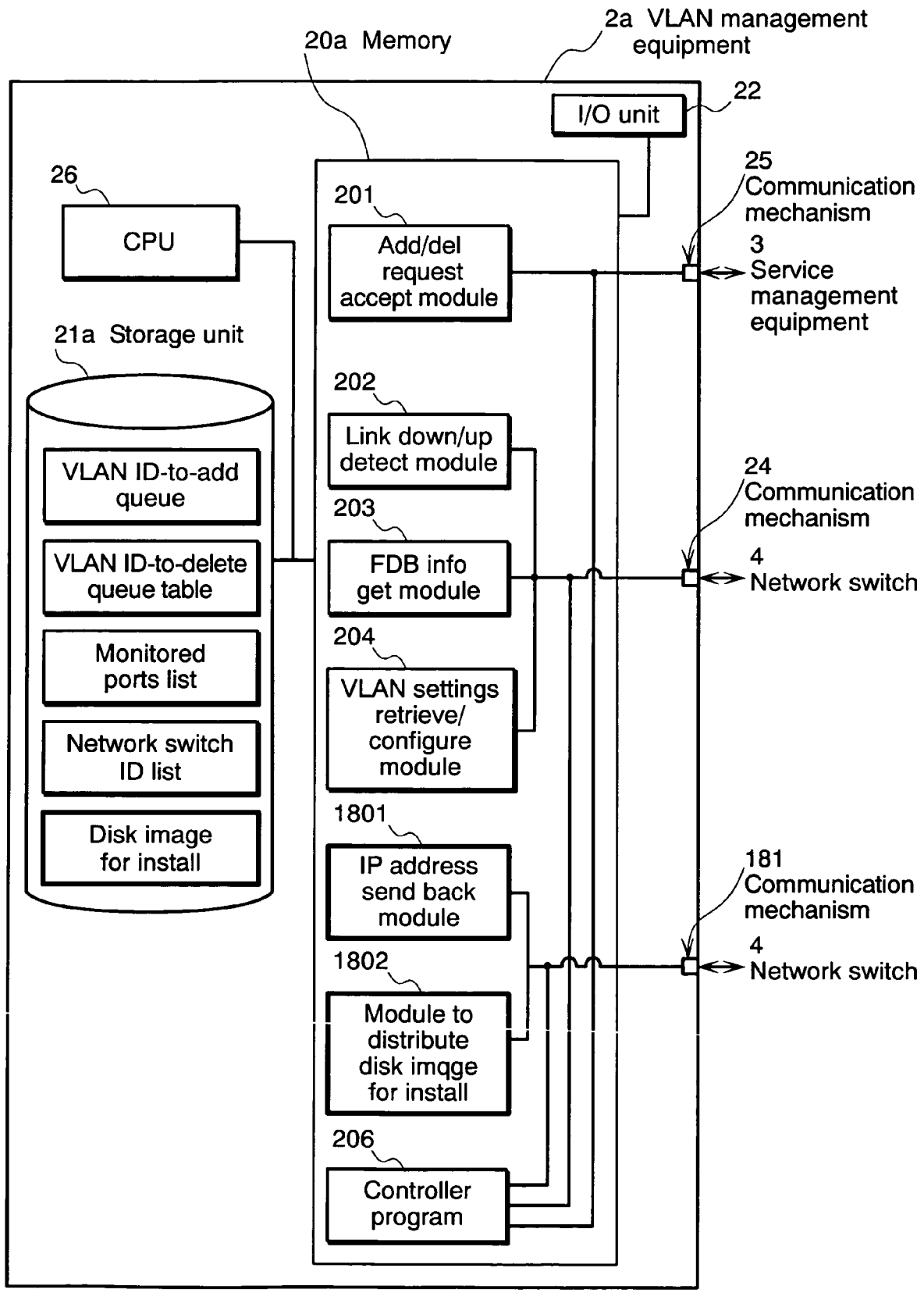
FIG. 18 is a diagram showing a configuration of a VLAN management equipment of a second embodiment.

VLAN Management Equipment Configuration:

FIG. 18 is a diagram showing an exemplary configuration of the VLAN management equipment of the second embodiment.

A difference between the VLAN management equipment 2a of the second embodiment and the VLAN management 2 of the first embodiment shown in FIG. 2 is that the IP address send back module 1801 and the module to distribute disk image for install 1802 shown in FIG. 2 are provided on the memory 20a, instead of the mirroring info retrieve/configure module 205. The IP address send back module 1801 and the module to distribute disk image for install 1802 are connected to the network switch 4 via the communication mechanism 181, and have the same functions as included in the system disk deployment server in FIG. 9. However, the module to distribute disk image for install in FIG. 9 is replaced with the module to distribute disk image for install 1802 in FIG. 18, and sends a disk image for install to a managed server 6. The processing when a disk image for install is executed will be described later.

The storage unit 21a additionally stores disk images for install. When this disk image for install is executed, the OS for install starts.

Service Management Equipment:

FIG. 19 is a diagram showing an exemplary configuration of the service management equipment of the second embodiment.

The service-VLAN mapping table held in the storage 31a has a condition list, which is described later with reference to FIGS. 20 and 21, in addition to the service-VLAN mapping table of the first embodiment.

Also, the VLAN management equipment 2a of this embodiment only belongs to an idle VLAN, and it is possible to receive packets from a newly added managed server 6.

Furthermore, the VLAN management equipment 2a of this embodiment communicates with ports of the network switch 4 of an idle VLAN, as described above. That is, the VLAN management equipment 2a is configured to be able to communicate only with an idle VLAN.

FIG. 20. shows an exemplary configuration of the service-VLAN mapping table of the second embodiment.

What is different from the first embodiment is that a condition list is added to each entry. The condition list is a list of conditions for deciding which NIC should belong to which VLAN when a server has multiple NICs. Also, it is possible for one service to have multiple VLANs, as shown for the "Web service" in FIG. 20.

A configuration of the condition list is described below with reference to FIGS. 1 and 21.

FIG. 21 shows an exemplary configuration of the condition list of the second embodiment.

The controller program 206 of the VLAN management equipment 2 (refer to FIG. 18) determines which VLAN an NIC should belong to, based on this condition list.

The condition list consists of the ID to be judged and the number to be judged. The ID to be judged is an identifier indicating the type of a component. As an example of the ID to be judged, the network switch ID of the network switch to which an NIC is connected, or at least one of the NIC IDs is held with a corresponding VLAN ID. Here, the NIC ID is a unique number assigned to the NIC in a single managed server 6. However, the same NIC ID may be assigned among different managed servers. If different managed servers 6 are connected to the same network switch 4 and their NIC IDs are the same, these NICs (NICs provided in the different managed servers 6) should belong to the same VLAN.

Since the NIC ID is assigned in the order of detection and is an identifier which is unique only within a managed server 6. Serial numbers such as the order of detection are used, and therefore the NIC ID is assigned according to the same naming convention (for example, NIC "number") for any managed server.

The reason for setting the network switch ID as the ID to be judged is as follows:

In the VLAN management system 1, if a plurality of network switches 4 are connected, VLANs managed by respective network switches 4 are different. Assume that, for example, one network switch manages the VLANs having VLAN 10, VLAN 20, and VLAN 30 respectively as VLAN ID, and another network switch manages the VLANs with VLAN 40 and VLAN 50 respectively. As described above, if different managed servers 6 are connected to the same network switch 4 and their NIC IDs are the same, the NICs provided in these different managed servers 6 belong to the same VLAN. However, for the above reason, NICs connected to different network switches 4 belong to different VLANs even if their NIC IDs are the same. Accordingly, to identify the VLAN to which a given NIC belongs, its NIC ID or network switch ID is required.

The number to be judged indicates the condition for a value to be judged. For example, if the ID to be judged is a network switch ID, a corresponding network switch ID value is registered, and if an NIC ID, an actual NIC ID is registered. The NIC ID of each NIC is automatically and mechanically generated and assigned by the managed server 6.

Since the ID to be judged and the number to be judged are basically not dependent on the managed server 6 individually, there is no need to additionally define a hardware device newly added to the VLAN management system 1.

In this embodiment, whether or not an NIC belongs to a given VLAN should depend on the NIC ID or network switch ID. For example, any NIC to which NIC 1 is assigned as NIC ID belongs to a predetermined VLAN. At this time, since the NIC ID is a unique value within the managed server 6, the same NIC ID may be sent from a different managed server 6. Even in such a case, NICs having the same NIC ID are all made to belong to the same VLAN.

Similarly, it is possible to distinguish VLANs by network switch ID. That is, in this case, all the ports within the network switch 4 belong to the same VLAN.

If two or more condition lists conflict with each other, for example, if a condition list A and a different condition list B return the results each of which belongs to a different VLAN, they may be defined in an implementation. For example, such a method is conceivable as processing as an error, having the user select, or selecting an arbitrary VLAN ID. If there is no item in a condition list, the user may select any NIC.

In this embodiment, the add/del request accept module 201 sends VLAN data-consisting of all sets of a VLAN ID corresponding to a service, not a VLAN ID, and a condition list. Also, the VLAN ID-to-add queue is stored as one piece of data consisting of data to be sent by the add/del request accept module 201.

In this embodiment, the managed server side port of the network switch 4 (refer to FIG. 1) is referred to as NIC side port.

Adding a Managed Server 6:

The flow of the process of adding a managed server 6 to the VLAN management system 1 of the second embodiment is described below, with reference to FIGS. 1 to 6, 3 to 10, and 18 to 21, as well as FIG. 22.

FIG. 22 is a timing chart showing the flow of the process of adding a managed server 6 to the VLAN management system 1 of the second embodiment.

Since the processing in FIG. 22 includes the processing common to both FIGS. 22 and 12, the common processing is given the same numeral to omit its description.

First, the administrator enters an advice of adding a managed server 6 to a service, to the controller program 302 of the service management equipment 3 (S1201).

Then, the controller program 302 searches the service-VLAN mapping table stored in the storage unit 31 using the entered service name as a key, and retrieves VLAN data corresponding to the entered service name (S2201).

The controller program 302 of the service management equipment 3 sends an add request containing the obtained VLAN data to the add/del request accept module 201 of the VLAN management equipment 2a (S2202).

The add/del request accept module 201 retrieves VLAN data from the received add request, and adds the received VLAN date to the VLAN ID-to-add queue (S2203).

After the managed server 6 is activated (S1205), the IP address advice request sent from the managed server 6 to the network switch 4 (S1206) is sent to the IP address send back module 1801 of the VLAN management equipment 2a by the control processor 401 of the network switch 4 (S2204).

After the IP address send back module 1801 of the VLAN management equipment 2a received an IP address advice request from a managed server in an idle VLAN, the IP address send back module 1801 sends a response to the IP address advice request containing its own IP address, to the network boot module 601 of the managed server 6, according to the MAC address included in the IP address advice request (S2205).

Then, the network boot module 601 sends a request to retrieve disk image for install containing its own IP address, to the module to distribute disk image for install of the VLAN management equipment 2a (S2206). The module to distribute disk image for install 1802 sends the disk image for install to the network boot module 601 of the requesting managed server 6, according to the IP address included in the received request to retrieve disk image for install (S2207).

The network boot module 601 of the managed server 6 that has received the disk image for install loads the received disk image for install on the memory, and executes the OS for install included in the loaded disk image for install (S2208).

Then, the controller program 602 of the managed server 6 searches all of its NICs to retrieve the MAC address list of all the NICs (S2209), and sends the MAC address list for identifying respective NICs to the controller program 206 of the VLAN management equipment 2a (S2210).

Now, the MAC address list of the second embodiment is described below with reference to FIG. 23.

FIG. 23 shows an exemplary format of the MAC address list of the second embodiment.

The MAC address list consists of a set of NIC ID (ID assigned to each NIC) and MAC address of the NIC.

Referring again to FIG. 22, the VLAN management equipment 2a the port number of the network switch corresponding to each MAC address included in the MAC address list (S2211). The processing at step S2211 is described later with reference to FIG. 24.

Then, after the VLAN management equipment 2a performed the VLAN configuration (S1208), the controller program 602 of the managed server 6 sends a ping command to the controller program 206 of the VLAN management equipment 2a (S2212), and the controller program 206 of the VLAN management equipment 2a sends a response to the ping command.

If a communication between the VLAN management equipment 2a and the managed server 6 fails to be made, i.e., a response from the VLAN management equipment 2a is not received, the controller program 602 of the managed server 6 determines that the VLAN configuration processing at step S1208 is completed (that is, the managed server 6 does not belong to an idle VLAN), and reactivates itself (S2213).

Then, the disk image for install and the disk image for service are downloaded and installed according to step S1205 and steps S1209 to S1218.

Retrieving Port Number: VLAN Management Equipment

The flow of the process of steps S2211 and S1208 in FIG. 22 is described below with reference to FIGS. 1 to 6, 3 to 10, and 18 to 21, as well as FIG. 24.

Figure 24:
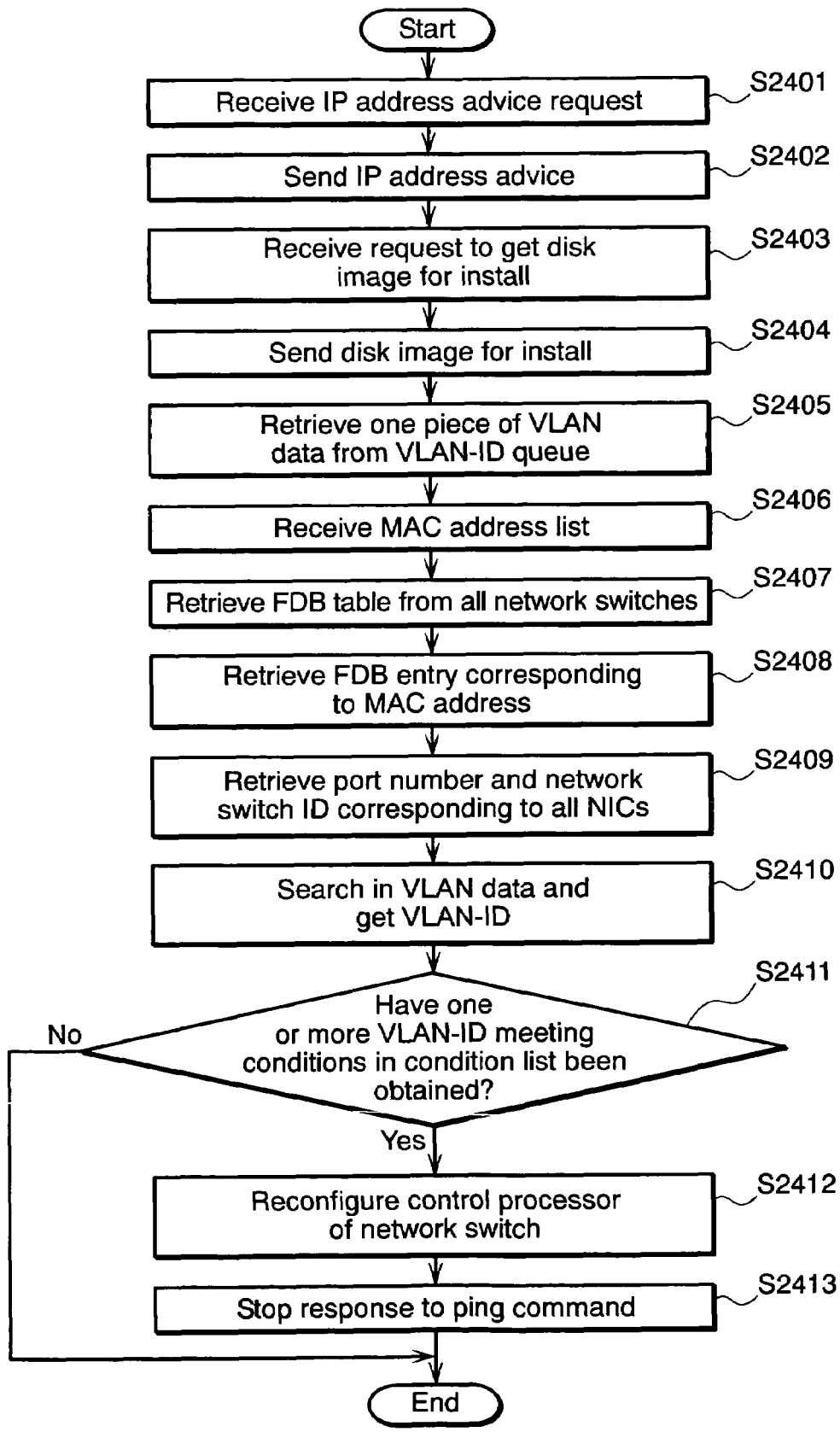
FIG. 24 is a flowchart showing the port number fetch process at step S2211 of FIG. 22 and the VLAN configuration process at step S1208.

FIG. 24 is a flowchart showing the process of retrieving port numbers at step S2211 in FIG. 22 and the process of VLAN configuration at step S1208.

Steps S2401 to S2409 in FIG. 24 correspond to the port number retrieval in FIG. 22, and steps S2410 to S2413 correspond to step S1208 in FIG. 22.

The VLAN management equipment 2a uses the same procedure as for the system disk deployment server 5 in FIGS. 12 and 14 to receive an IP address advice request from a managed server 6 (S2401), and sends a response to the IP address advice request containing its own IP address to the network boot module 601 of the managed server 6, according to the MAC address included in this IP address advice request (S2402).

The module to distribute disk image for install 1802 receives a request to retrieve disk image for install containing the IP address of the managed server 6 from the network boot module 601 (S2403), and sends the disk image for install to the network boot module 601, using the same procedure as for the sending of the disk image for install by the system disk deployment server 5 (see FIG. 15) (S2404).

The controller program 206 retrieves one piece of VLAN data from the VLAN ID-to-add queue stored in itself (S2405).

The controller program 206 then receives the MAC address list from the controller program 602 of the managed sever 6 (S2406).

Then, the FDB retrieve module 203 retrieves the FDB table from the control processor 401 for all the network switches 4 being managed by the VLAN management equipment 2, based on the network switch IDs held in the network switch ID list in the storage unit 21 (S2407).

Next, the controller program 206 searches sequentially the FDB table for all the network switches 42 under the management of the VLAN management equipment 2, using the MAC addresses in the MAC address list obtained at step S2306 as keys sequentially, retrieves FDB entries corresponding to these MAC addresses (S2408), and retrieves the NIC side port numbers in corresponding FDB entries and the network switch ID of the network switch 4 when the NIC side ports were searched (S2309).

Next, the controller program 206 searches the condition list for VLAN data, for each NIC ID in the MAC address list, using the NIC ID and the network switch ID of the network switch 4 obtained at step S2409 as keys, and retrieves a corresponding VLAN ID (S2410).

Then, the controller program 206 determines whether or not one or more VLAN IDs have been retrieved that meet the conditions in the condition list at step S2410 (S2411). At step S2411, if there is no VLAN ID corresponding to the network ID or NIC ID ("No" at S2411), the controller program 206 regards it as an error, and terminates the process with an error message returned to the managed server 6.

At step S2411, if there is a VLAN ID corresponding to the network switch ID or NIC ID ("Yes" at S2411), the controller program 206 retrieves that VLAN ID and goes to step S2412.

At step S2412, the VLAN info retrieve/configure module 204 of the VLAN management equipment 2a change the setting of the control processor 401 of the network switch 4, such that the port identified by the port number of the network switch 4 retrieved at step S2409 belongs to the VLAN identified by the VLAN ID obtained at step S2411.

The IP address send back module 1801 suspends a response to a ping command from the managed server 6 (at step S2212 in FIG. 22) for a certain period of time (S2413). The managed server 6 identifies the confirmation of the VLAN configuration by detecting a disconnection from the server according to the procedure (described below) in FIG. 24, and reactivates itself.

Retrieving each Disk Image: Managed Server

The flow of the processing executed by the managed server 6 in FIG. 22 is described below with reference to FIGS. 1 to 6, 3 to 10, 18 to 21, and 25.

Figure 25:
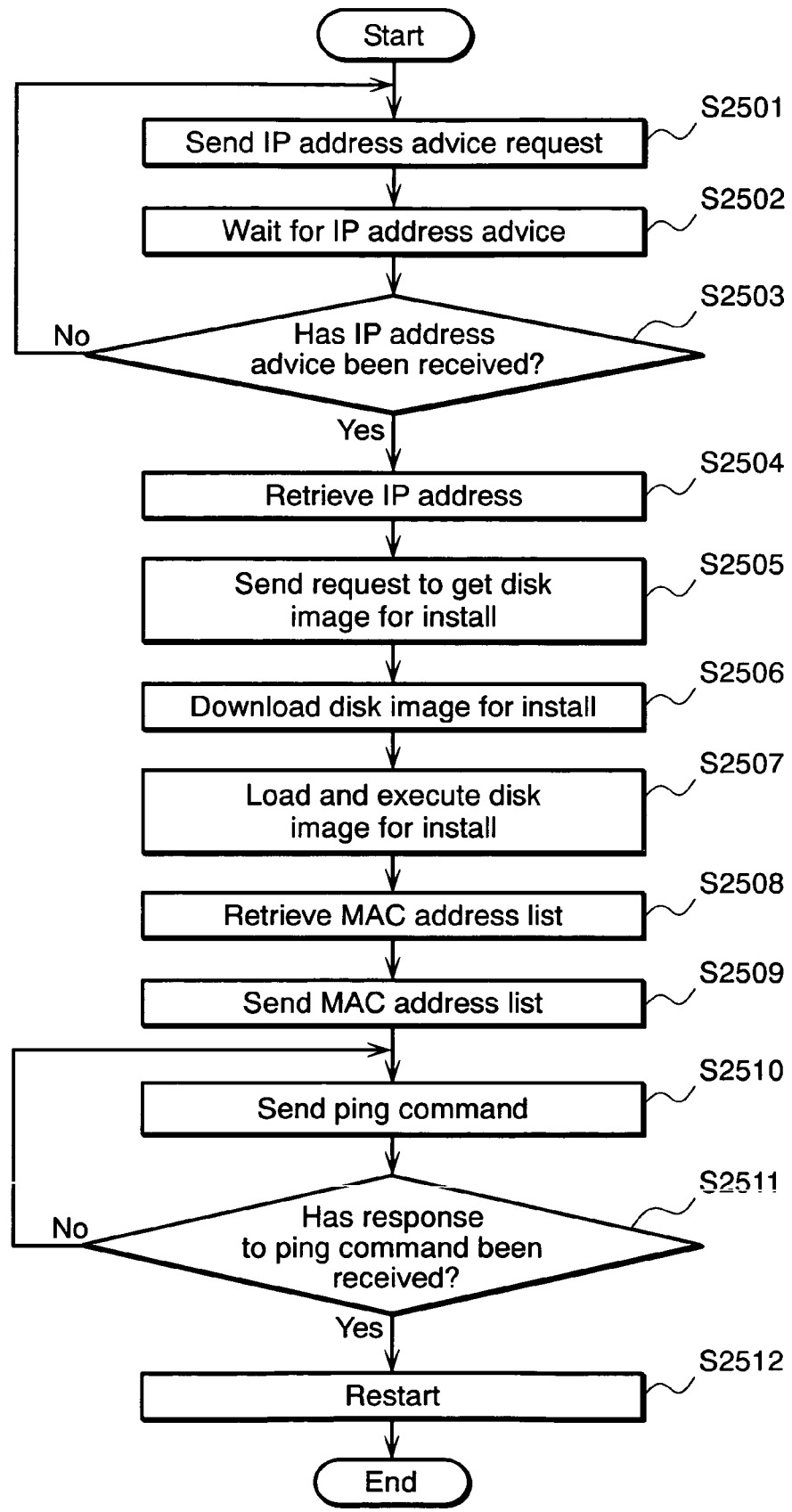
FIG. 25 is a flowchart showing the execution process of a managed server of FIG. 22.

FIG. 25 is a flowchart showing the flow of the processing executed by the managed server in FIG. 22.

First, the network boot module 601 in the managed server 6 sends an IP address advice request containing the MAC address of the NIC provided in itself, to the IP address send back module 1801 of the VLAN management equipment 2a (S2501).

Next, the network boot module 601 waits for a response to the IP address advice request from the IP address send back module 1801 of the VLAN management equipment 2a for a predetermined period of time (S2502).

At step S2503, the network boot module 601 determines whether or not a response to the IP address advice request is received.

As a result of the judgment at step S2503, if the network boot module 601 has not received a response to the IP address advice request ("No" at S2503), control returns to step S2501, and the network boot module 601 broadcasts again the IP address advice request.

As a result of the judgment at step S2503, if the network boot module 601 has received a response to the IP address advice request ("Yes" at S2503), control goes to step S2504.

If a response to IP address advice request is not received after repeating the transmission of an IP address advice request certain times (not shown), the network boot module 601 regards it as a failure to obtain an IP address, and terminates the process.

The network boot module 601 retrieves the IP address (the IP address of the VLAN management equipment 2) contained in the response to IP address advice request received at step S2503 (S2504).

Then, the network boot module 601 sends a request to retrieve disk image for install to the IP address (the IP address of the VLAN management equipment 2) obtained at step 2504 (S2505) The request to retrieve disk image for install includes the IP address of the managed server 6 (the source). The module to distribute disk image for install 1802 of the VLAN management equipment 2a retrieves the IP address of the managed server 6 contained in the request to retrieve disk image for install, and sends the disk image for install to the managed server 6 having the obtained IP address, in response to the request to retrieve disk image for install. In this way, the network boot module 601 of the managed server 6 downloads the disk image for install (S2506).

The network boot module 601 loads the disk image for install downloaded at step S2506 on the memory in the managed server 6, and executes the OS for install in that disk image (S2507).

The controller program 602 for which the OS for install was executed at step S2507 detects all the NICs provided in the managed server 6 being operated by it, and obtains their MAC addresses (S2508).

Then, the send/receive module 621 sends the received MAC address list to the controller program 206 of the VLAN management equipment 2a via the network switch 4 (S2509). The MAC address list to be sent is a list of sets of NIC ID indicating the order of NIC detection within a managed server 6 and corresponding MAC address, as described with reference to FIG. 23.

The controller program 602 of the managed server 6 sends a ping command periodically to the IP address send back module 1801 (S2510), and determines whether or not a response to the ping command is received from the IP address send back module 1801 (S2511).

If a response to ping command is not received ("No" at S2511), control returns to step S2510.

If a response to ping command is received ("Yes" at S2511), the controller program 602 determines that a communication between the VLAN management equipment 2a and the managed server 6 is not available, that is, the VLAN configuration processing at step S1208 in FIG. 12 is completed (i.e., the managed server 6 does not belong to an idle VLAN any more), and the managed server 6 reactivates itself (S2512).

In the reactivated managed server 6, the network boot module 601 operates again. The network boot module 601 of the reactivated managed server 6 then retrieves the IP address of the system disk deployment server 5, via the VLAN configured at step S2507. Also, the managed server 6 performs steps S1508 to S1512 in FIG. 15 to download and load the system disk image for service.

The second embodiment has the following advantages, compared with the first embodiment. If multiple NICs are provided in a managed server 6, it is possible to perform VLAN configuration for each NIC. That is, it is possible to make a single managed server 6 belong to multiple VLANs. It is also possible to provide multiple NICs in a managed server 6 of the first embodiment.

Program:

The functions of the modules shown in FIGS. 2, 6, 8, 9, 11, and 18 are implemented by deploying the programs stored on the hard disk drive on RAM (Random Access Memory) and being executed by the CPU.

Having described a preferred embodiments of the invention with reference to the accompanying drawing, it is to be understood that the invention is not limited to the embodiments and that various changes and modifications could be effected therein by one skilled in the art without departing from the spirit or scope of the invention as defined in the appended claims.

What is claimed is:

1. A virtual network management method for a virtual network management system configuring different virtual networks for different services, including: at least one network switch; at least one managed server for managing a service; a service management means for managing the service to be processed by the managed server; and a virtual network management means for controlling connections by the network switch, the method comprising the steps of:

allowing the service management means to hold a mapping of the service and the virtual network;

causing the managed server to send a notification including address information of the managed server to the virtual network management means, upon status change of the managed server;

causing the virtual network management means to receive the notification including the address information from the managed server;

causing the virtual network management means to receive information from the network switch, wherein the information from the network switch indicates a relation between the address information of the managed server and a connection port of the network switch;

causing the virtual network management means to identify the managed server and the connection port of the network switch dynamically upon status change of the managed server, by referring to the address information included in the received notification and the information which indicates the relation between the address information of the managed server and the connection port of the network switch; and causing the virtual network management means to configure the virtual network corresponding to the service dynamically, for the identified connection port.

2. The virtual network management method according to claim 1, wherein:

the status change is activation of the managed server; and configuring the virtual network includes adding the managed server to the virtual network.

3. The virtual network management method according to claim 1, the virtual network management system further including a system disk deployment means holding an operating system and application software, wherein:

after configuring the virtual network, the system disk deployment means sends the operating system and application software to the identified connection port; and the managed server connected the connection port loads and executes the operating system and application software that have been sent.

4. A virtual network management method according to claim 3, wherein the system disk deployment means is provided in the virtual network management system.

5. A virtual-network management method according to claim 1, wherein:

the status change is a stop of the managed server; and configuring the virtual network includes deleting the managed server from the virtual network.

6. A virtual network management system configuring different virtual networks for different services, including: at least one network switch; at least one managed server for managing a service; a service management means for managing the service to be processed by the managed server; and a virtual network management means for controlling connection by the network switch, wherein:

the service management means has a function of holding a mapping of the service and the virtual network as management information;

the managed server has a function of sending a notification including an address information of the managed server to the virtual network management means, upon status change of the managed server; and the virtual network management means has functions comprising:

receiving the notification including the address information from the managed server, receiving information which indicates a relation between the address information of the managed server and a connection port of the network switch from the network switch, identifying the managed server and the connection port of the network switch dynamically upon status change of the managed server, by referring to the address information included in the received notification and the information which indicates the relation between the address information of the managed server and the connection port the network switch, and dynamically configuring the virtual network belonging to the identified connection port.

7. A virtual network management means for a virtual network management system configuring virtual networks, in a system including: at least one network switch; at least one managed server for managing a service; service management means for holding a mapping of the service and a corresponding virtual network as management information, and managing the service to be processed by the managed server; and the virtual network management means for controlling connection by the network switch, the virtual network management means implementing functions comprising:

receiving a notification, upon status change of the managed server, including an address information of the managed server and the status of the managed server;

receiving information from the network switch, wherein the information from the network switch indicates a relation between the address information of the managed server and a connection port of the network switch;

identifying the managed server and the connection port of the network switch by referring to the address information included in the received notification and the information that indicates the relation between the address information of the managed server and the connection port of the network switch; and dynamically configuring the virtual network belonging to the identified connection port.

* * * * *